United States Patent
Mori et al.

(10) Patent No.: US 7,367,625 B2
(45) Date of Patent: May 6, 2008

(54) RETRACTABLE SEATS

(75) Inventors: Masaki Mori, Tajimi (JP); Masao Miura, Anjo (JP); Yoshihiro Ohishi, Nisshin (JP)

(73) Assignee: Toyota Boshoku Kabushiki Kaisha, Aichi-ken (JP)

( * ) Notice: Subject to any disclaimer, the term of this patent is extended or adjusted under 35 U.S.C. 154(b) by 394 days.

(21) Appl. No.: 10/990,601

(22) Filed: Nov. 17, 2004

(65) Prior Publication Data

US 2005/0110324 A1  May 26, 2005

(30) Foreign Application Priority Data

| Nov. 20, 2003 | (JP) | ............................. 2003-390865 |
| Mar. 3, 2004 | (JP) | ............................. 2004-059096 |
| May 6, 2004 | (JP) | ............................. 2004-137344 |
| Oct. 14, 2004 | (JP) | ............................. 2004-300202 |
| Oct. 14, 2004 | (JP) | ............................. 2004-300203 |

(51) Int. Cl.
*B60N 2/20* (2006.01)

(52) U.S. Cl. .................. 297/378.12; 297/316; 297/340

(58) Field of Classification Search ................ 297/316, 297/321, 378.12, 378.1, 340, 341
See application file for complete search history.

(56) References Cited

U.S. PATENT DOCUMENTS

| 4,805,953 A | * | 2/1989 | Yamauchi | ................ 296/65.09 |
| 6,199,951 B1 | | 3/2001 | Zeile et al. | |
| 6,450,579 B1 | * | 9/2002 | Nylander et al. | ........ 297/378.1 |
| 6,902,236 B2 | * | 6/2005 | Tame | ......................... 297/335 |
| 7,137,666 B2 | * | 11/2006 | Haladuda et al. | ...... 397/378.12 |
| 2005/0093355 A1 | | 5/2005 | Habedank | |
| 2006/0061183 A1 | * | 3/2006 | White et al. | ........... 297/378.12 |

FOREIGN PATENT DOCUMENTS

| DE | 100 55 205 A1 | 6/2002 |
| DE | 103 51 157 B3 | 6/2005 |
| FR | 2 815 303 | 4/2002 |
| JP | 60-168633 | 11/1985 |
| JP | 2000-041784 | 2/2000 |
| JP | 2000-316663 | 11/2000 |
| JP | 2002-264708 | 9/2002 |
| WO | WO 2004/065162 A2 | 8/2004 |

* cited by examiner

*Primary Examiner*—Peter R. Brown
(74) *Attorney, Agent, or Firm*—Patterson, Thuente, Skaar & Christensen, P.A.

(57) ABSTRACT

A retractable seat may include a seat cushion and a seat back rotatably supported on the seat cushion in which one of the seat cushion and the seat back is arranged and constructed to be folded onto the other of the seat cushion and the seat back. At least one of the seat cushion and the seat back includes a frame, a cushion pad, and a linking mechanism. The frame includes a framework and a support member that supports the cushion pad from a backside of the cushion pad. The linking mechanism movably interconnects the framework and the support member and is arranged and constructed to move the support member toward a backside of the at least one of the seat cushion and the seat back when the seat cushion or the seat back is tilted toward a retracted position.

10 Claims, 20 Drawing Sheets

RETRACTABLE SEATS

BACKGROUND OF THE INVENTION

1. Field of the Invention

The present invention relates to retractable seats for a vehicle. More particularly, the present invention relates to retractable seats that can be retracted by tilting seat backs forwardly and superimposing the seat backs on seat cushions.

2. Description of the Related Art

A retractable seat of this type is taught, for example, by Japanese Laid-Open Patent Publication No. 2002-264708.

Typically, the seat includes a seat back and a seat cushion. The seat back is rotatably connected to the seat cushion so as to be tilted. The seat back is provided with a back panel. In the known art, the back panel is arranged and constructed such that a clearance is formed between the seat back and the back panel. Also, the seat back includes a clearance adjusting means. The clearance adjusting means is constructed such that the clearance can be changed when the seat back is tilted forwardly and rearwardly. That is, the clearance adjusting means is constructed such that the clearance can be reduced when the seat back is folded forwardly and that the clearance can be increased when the seat back is raised rearwardly.

Thus, when the seat back is folded, the clearance is reduced and the total thickness of the seat back and the back panel can be somewhat reduced. As a result, the seat can be retracted within a limited retracting space.

However, in the retractable seat thus constructed, the total thickness is not so reduced because there is a limit to the changing of the clearance.

SUMMARY OF THE INVENTION

It is, accordingly, one object of the present teachings to provide an improved, retractable vehicle seat.

For example, in one aspect of the present teachings, a retractable seat may include a seat cushion and a seat back rotatably supported on the seat cushion in which one of the seat cushion and the seat back is arranged and constructed to be folded onto the other of the seat cushion and the seat back. At least one of the seat cushion and the seat back includes a frame, a cushion pad, and a linking mechanism. The frame includes a framework and a support member that supports the cushion pad from the backside of the cushion pad. The linking mechanism movably interconnects the framework and the support member and is arranged and constructed to move the support member toward a backside of the at least one of the seat cushion and the seat back when the seat cushion or the seat back is tilted toward a retracted position.

According to this retractable seat, when the seat cushion or the seat back is folded, the total thickness of the seat back and the back panel can be effectively reduced. As a result, the seat can be retracted within a limited retracting space.

Other objects, features, and advantages, of the present invention will be readily understood after reading the following detailed description together with the accompanying drawings and the claims.

DETAILED DESCRIPTION OF THE INVENTION

Figure 1:
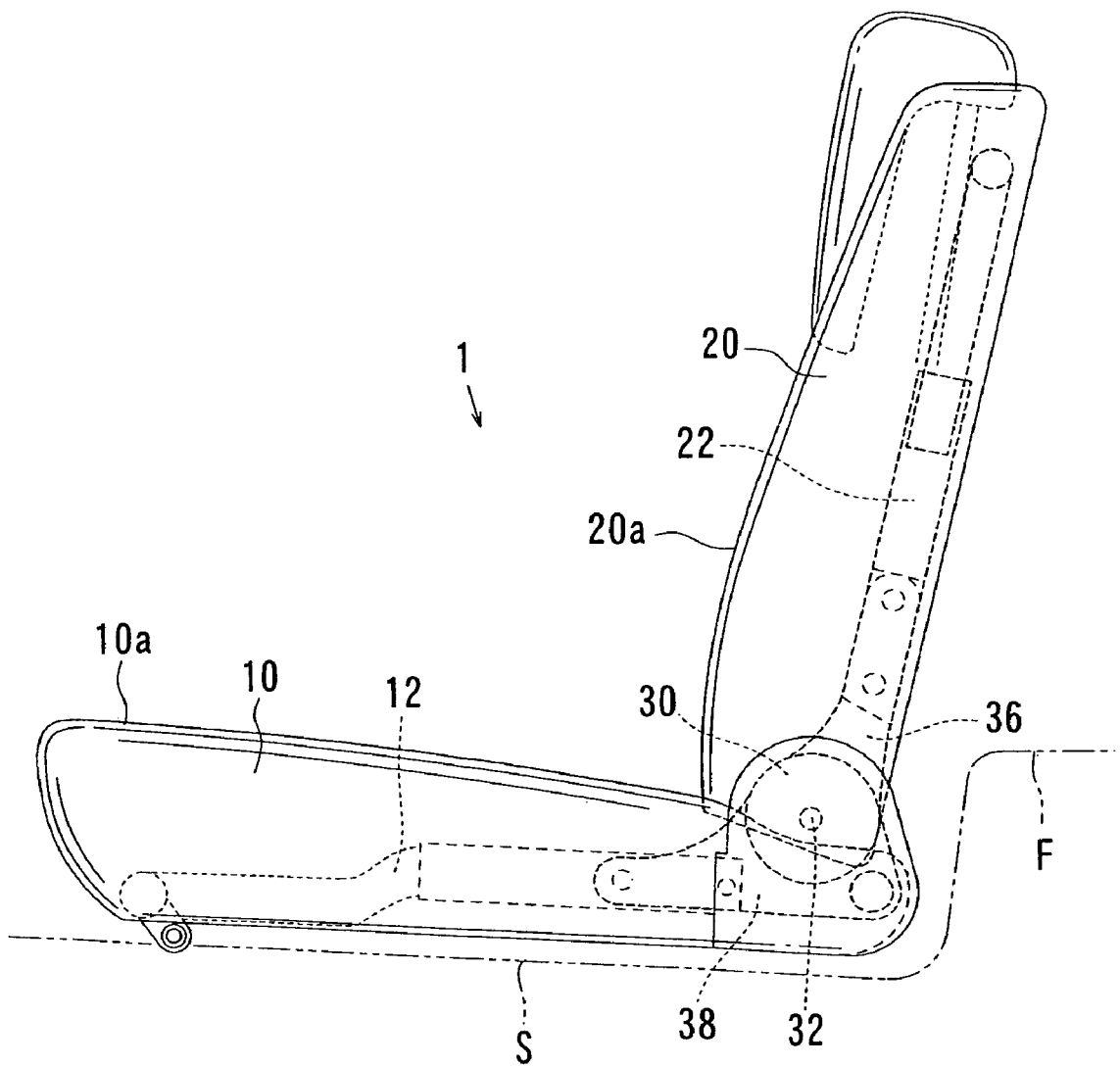
FIG. 1 is a side view of a retractable vehicle seat according to a first embodiment of the present invention, illustrating a condition in which a seat back is in a use or raised position.

Four detailed representative embodiments of the present teachings will now be described in further detail with reference to FIGS. 1 to 27.

First Detailed Representative Embodiment

The first detailed representative embodiment will now described with reference to FIGS. 1 to 9.

As shown in FIGS. 1 to 4, a retractable seat (rear seat) 1 may include a seat cushion 10 and a seat back 20. The seat cushion 10 is generally supported on a vehicle floor (not shown). The seat cushion 10 may preferably be constituted of a cushion frame 12, a cushion pad 18 attached to the cushion frame 12, and a skin layer or outer cover 10a (FIG. 1) that covers or encloses the pad 18. Similarly, the seat back 20 may preferably be constituted of a back frame 22, a back pad 28 attached to the back frame 22, and a skin layer or outer cover 20a (FIG. 1) that covers or encloses the pad 28.

Figure 4:
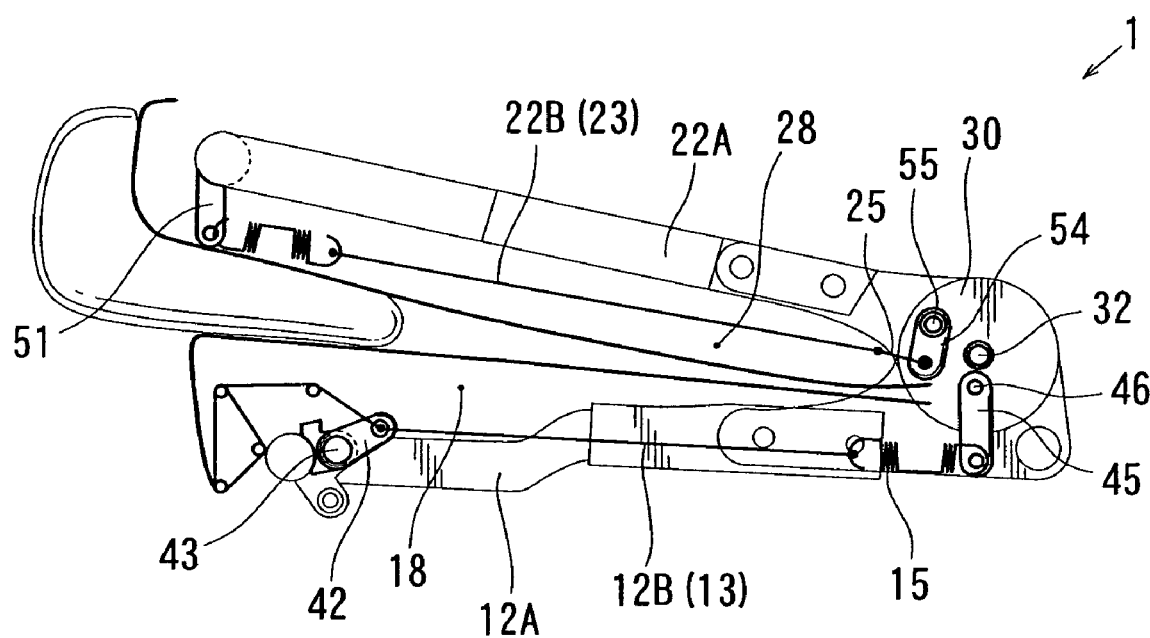
FIG. 4 is a side view of the retractable seat, illustrating a condition in which the seat back is in a retracted position.

The cushion frame 12 of the seat cushion 10 is rotatably connected to the back frame 22 of the seat back 20 via a pair of seat reclining devices 30 (one of which is shown). The reclining device 30, for example, can tilt the seat back 20 forwardly (i.e., counterclockwise) from a normal or use position (FIGS. 1 and 2), superimpose the same on the seat cushion 10, and retain the seat back 20 in that position, i.e., a retracted position (FIG. 4). As will be appreciated, the retractable seat 1 may preferably be designed so as to be retracted into a retracting space S formed in a vehicle floor F when the seat back 20 is superimposed on the seat cushion 10.

Typically, the seat reclining devices 30 allow the back frame 22 to be rotated forward and rearward (i.e., counterclockwise and clockwise) around rotational shafts (i.e., rotational axes) 32, and to be locked in a desired rotational position. This allows the seat back 20 to be adjusted to a desired tilting position relative to the seat cushion 10. As will be appreciated, if the seat reclining devices 30 are of motor-driven types, the back frame 22 can be rotated forward and rearward by normally and reversely driving a motor (not shown).

Figure 5:
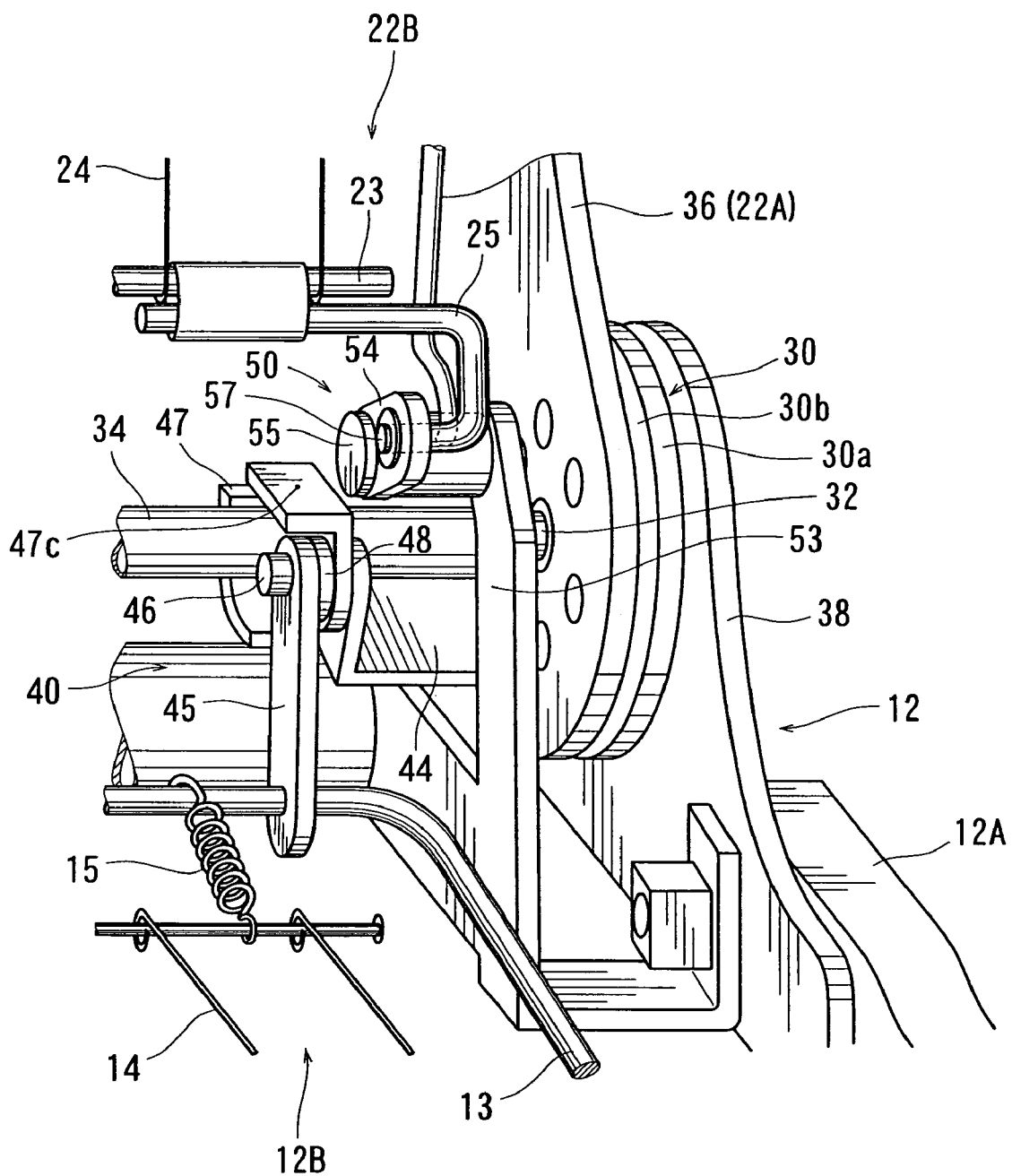
FIG. 5 is an enlarged perspective view of a connecting portion of a back frame and a cushion frame.

As shown in FIG. 5, each of the seat reclining devices 30 includes a pair of opposing disk-like housings, i.e., a first housing 30a and a second housing 30b, that are arranged and constructed to rotate around the rotational shaft 32. The first housing 30a is attached to a lower arm 38 fixed to the rear end of the cushion frame 12 (the framework 12A) by means of an appropriate bonding means such as welding. The second housing 30b is attached to an upper arm 36 fixed to the lower end of the back frame 22 by means of an appropriate bonding means such as welding. The first and second housings 30a and 30b are circumferentially connected by means of a fastener or clip ring (not shown) so that the second housing 30b can move or rotate relative to the first housing 30a around the rotational shaft 32. Further, the respective rotational shafts 32 are interconnected via a connecting shaft 34.

As shown in FIGS. 1 to 4, the cushion frame 12 may preferably be constituted of an outer frame member or framework 12A and a central or inner support member or pad support 12B for supporting a substantial portion of the cushion pad 18 from a backside (under surface) thereof. Similarly, the back frame 22 may preferably be constituted of an outer frame member or framework 22A and a central or inner frame member or pad support 22B for supporting the cushion pad 28 from a backside (rear surface) thereof.

Further, conventionally, the frameworks 12A and 22A are respectively integrally connected to the pad supports 12B and 22B, so as not to permit relative motion therebetween. However, in this embodiment, the frameworks 12A and 22A are respectively separated from the pad supports 12B and 22B and are respectively relatively movably combined therewith. That is, the pad supports 12B and 22B may preferably be movably connected or linked to the frameworks 12A and 22A by means of at least two first linking mechanisms (i.e., coupling means) 40 and at least two second linking mechanisms (i.e., coupling means) 50 (see FIG. 5, which will be hereinafter described).

As partly shown in FIG. 5, the pad support 12B of the cushion frame 12 may preferably be constituted of an outer rectangular support frame 13 and an inner support net 14. The support net 14 may preferably be formed as a crosswise combination of a plurality of spring wires. Further, the support net 14 may preferably be resiliently connected to the support frame 13 by means of plurality of coil springs 15 (one of which is shown). Similarly, the pad support 22B of the back frame 22 may preferably be constituted of an outer rectangular support frame 23 and an inner support net 24. The support net 24 may preferably be formed as a crosswise combination of a plurality of spring wires. Further, unlike the support net 14, the support net 24 may preferably be directly connected to the support frame 23.

As shown in FIGS. 5 and 7 to 9, each of the first linking mechanisms 40 includes a front link arm 42, a front bracket 41 that is fixed to the framework 12A, a rear drive link arm 45, a rear special arm 47, and a rear bracket 44 that is fixed to the upper arm 36 of the back frame 22 (the framework 22A). The front link arm 42 may preferably be rotatably connected to a front bracket 41 via a pivot pin 43. Further, a free end of the front link arm 42 may preferably be pivotally connected to the support frame 13 of the pad support 12B.

The rear link arm 45 may preferably be rotatably connected to the rear bracket 44 via a pivot pin 46 interleaving the rear special arm 47 therebetween. As will be apparent, the pivot pin 46 is not aligned with the rotational shaft 32 of the reclining device 30 (i.e., a rotational axis of the seat back 20) and is displaced forwardly therefrom. In addition, a spacer 48 may preferably be interleaved between the rear link arm 45 and the rear special arm 47 so that the rear link arm 45 and the rear special arm 47 can be appropriately positioned along the pivot pin 46. Further, a free end of the rear link arm 45 is movably connected to the support frame 13 of the pad support 12B.

Thus, the support frame 13 of the pad support 12B may preferably be supported by at least four supporting points.

Figure 6:
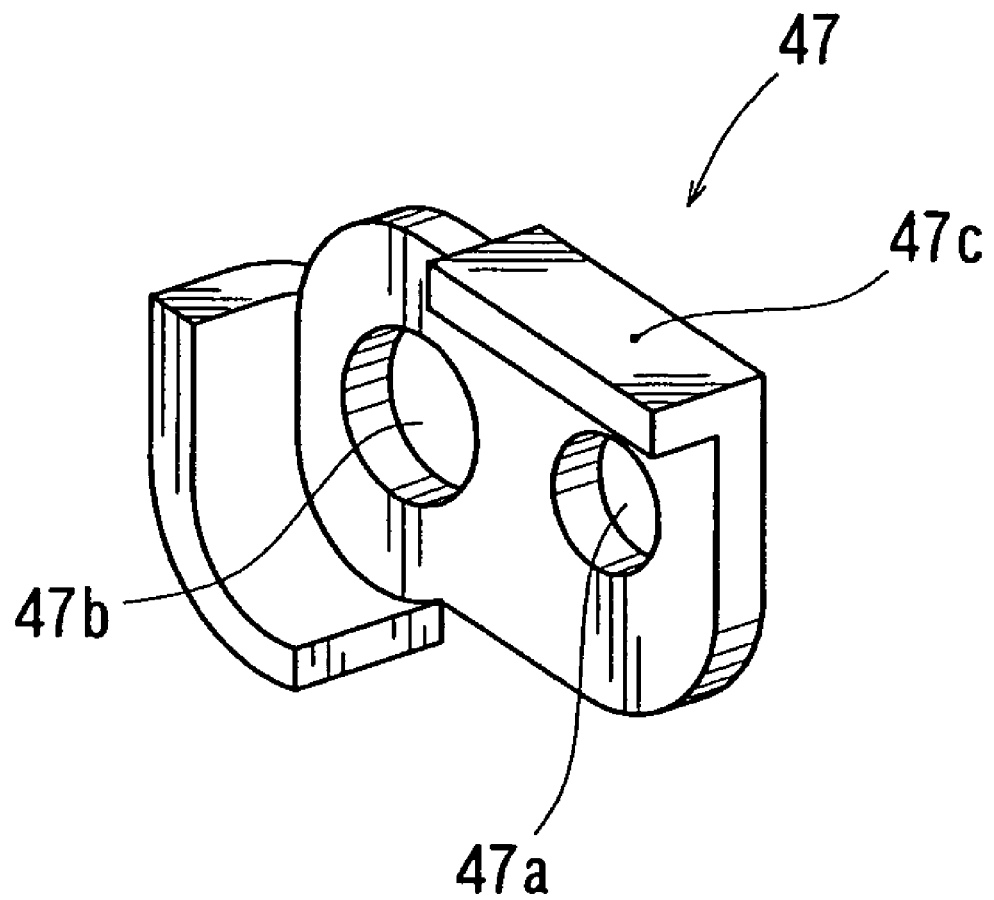
FIG. 6 is a perspective view of an arm used in the retractable seat.

As shown in FIG. 6, the rear special arm 47 includes first and second through holes 47a and 47b and a contact projection 47c. The first and second through holes 47a and 47b are respectively arranged and constructed to receive the pivot pin 46 and the connecting shaft 34. Therefore, when the back frame 22 is forwardly rotated around the rotational shaft 32 connected to the connecting shaft 34 so that the rear bracket 44 is pivoted around the rotational shaft 32, the rear special arm 47 may also preferably rotate around the connecting shaft 34 (counterclockwise in FIGS. 7-9). As a result, the contact projections 47c of the rear special arms 47 contacts the rear link arms 45 (FIG. 9), thereby urging each rear link arm 45 such that the rear link arm 45 rotates in the corresponding direction (i.e., counterclockwise).

As shown in FIGS. 5 and 7 to 9, each of the second linking mechanisms 50 includes an upper link bracket 51 that is fixed to the framework 22A, a lower drive link arm 54, and a lower bracket 53 that is fixed to the lower arm 38 (the framework 12A of the cushion frame 12). A free end of the upper link bracket 51 may preferably engage the support frame 23 of the pad support 22B via a spring 52.

The lower link arm 54 may preferably be rotatably connected to the lower bracket 53 via a pivot pin 55. Further, a free end of the lower link arm 54 is pivotally connected to the support frame 23 of the pad support 22B via a connecting arm 25 that is coupled to the support frame 23 (FIG. 5). That is, the lower link arm 54 is pivotally connected to the connecting arm 25 at a connecting point 57 that is displaced from the pivot pin 55 (i.e., a rotational axis of the lower link arm 54).

Thus, the support frame 23 of the pad support 22B may preferably be supported by at least four supporting points.

Figure 2:
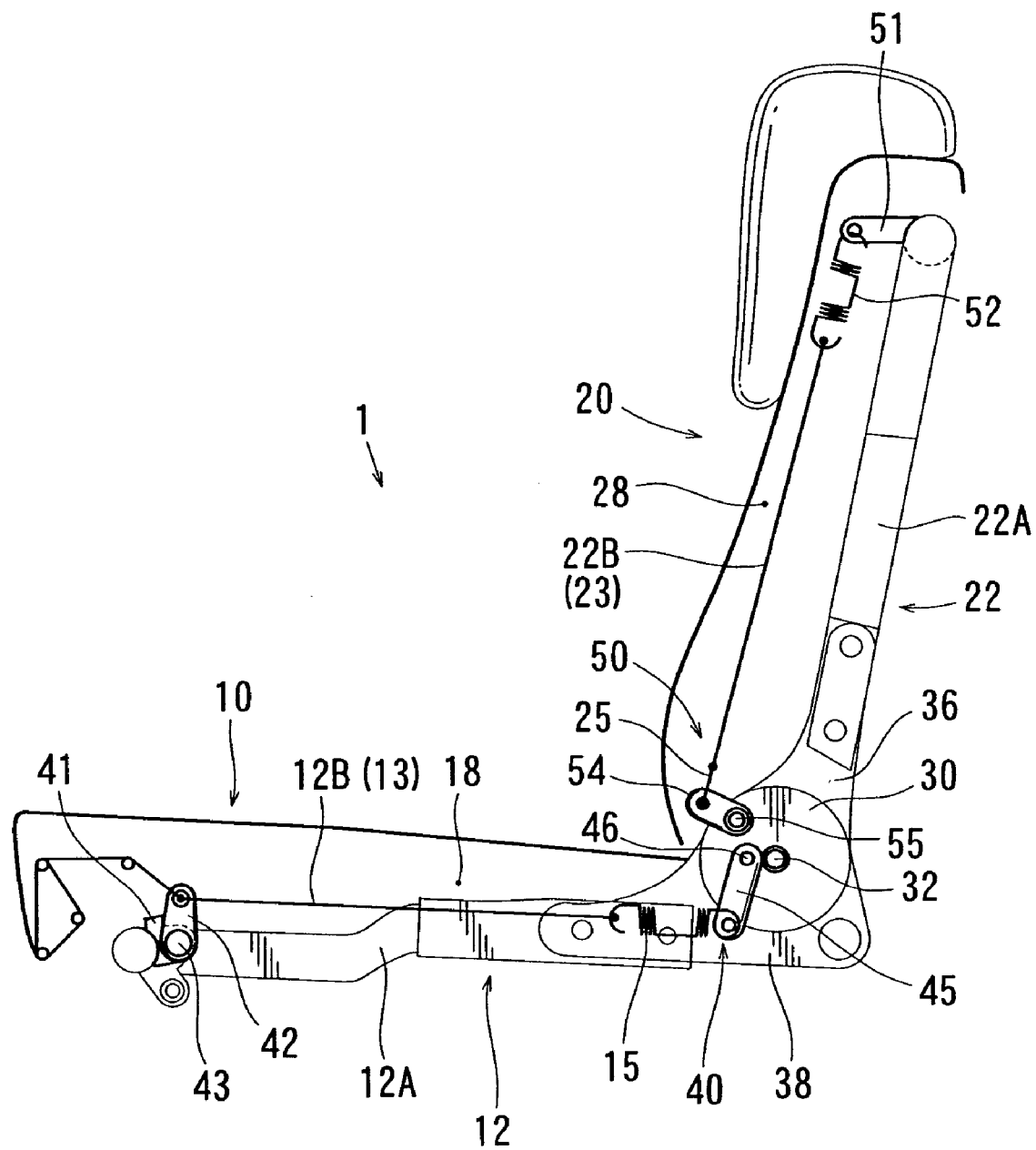
FIG. 2 is a partially omitted side view of the retractable vehicle seat shown in FIG. 1.
Figure 3:
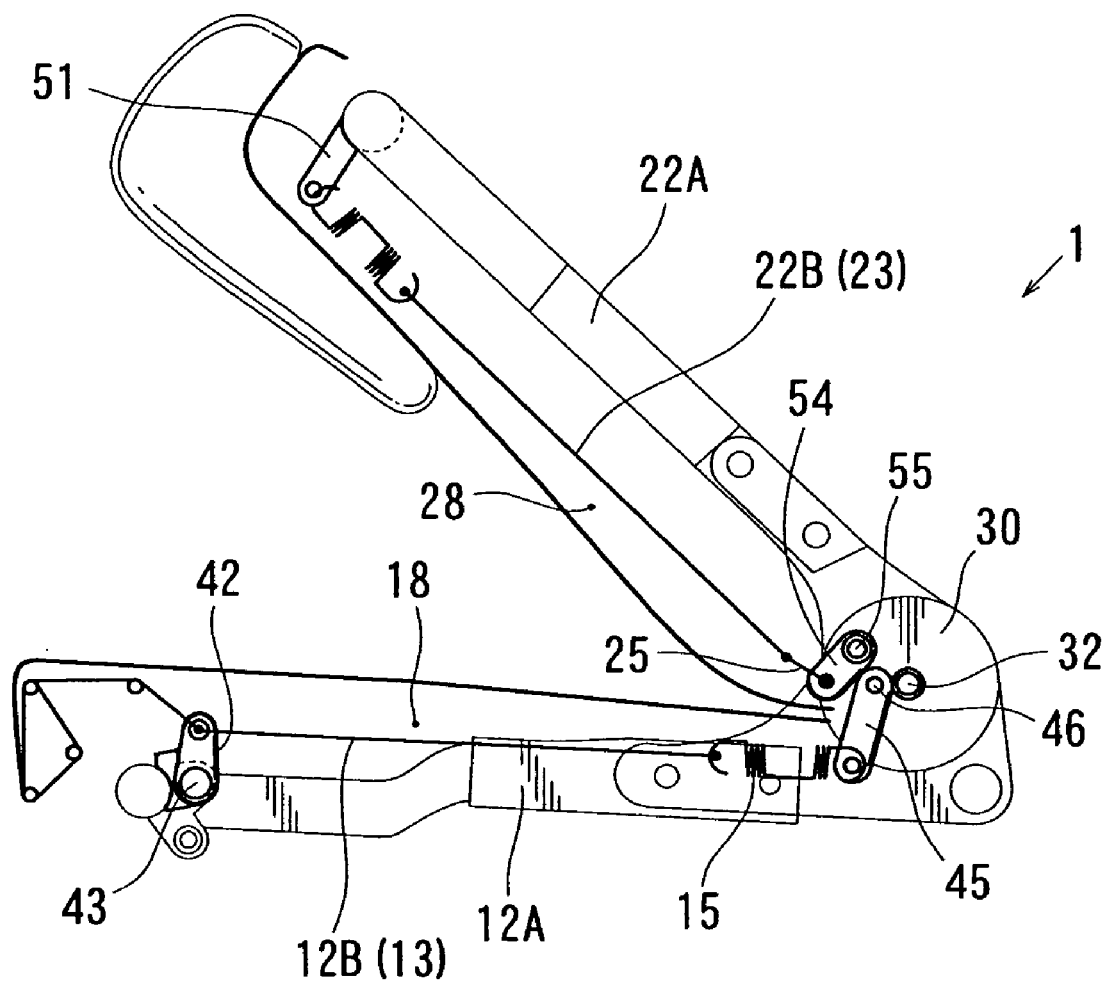
FIG. 3 is a side view of the retractable seat, illustrating a condition in which the seat back is started to be tilted forwardly (i.e., a intermediate position of the seat back)

Further, as shown in FIG. 2, when the seat 1 is positioned in a use condition, the pad support 12B is positioned in substantially an uppermost position. Also, the pad support 22B is positioned in substantially a forwardmost position. Thus, the seat cushion 10 and the seat back 20 may respectively have a maximum thickness.

Next, an operation for switching the seat 1 from the use condition to a retracted condition will be described with reference to, in particular, FIGS. 2 to 4 and 7 to 9. Further, it is noted that the motion of the cushion frame 12 and the back frame 22 is substituted for the corresponding motion of the seat cushion 10 and the seat back 20.

Figure 7:
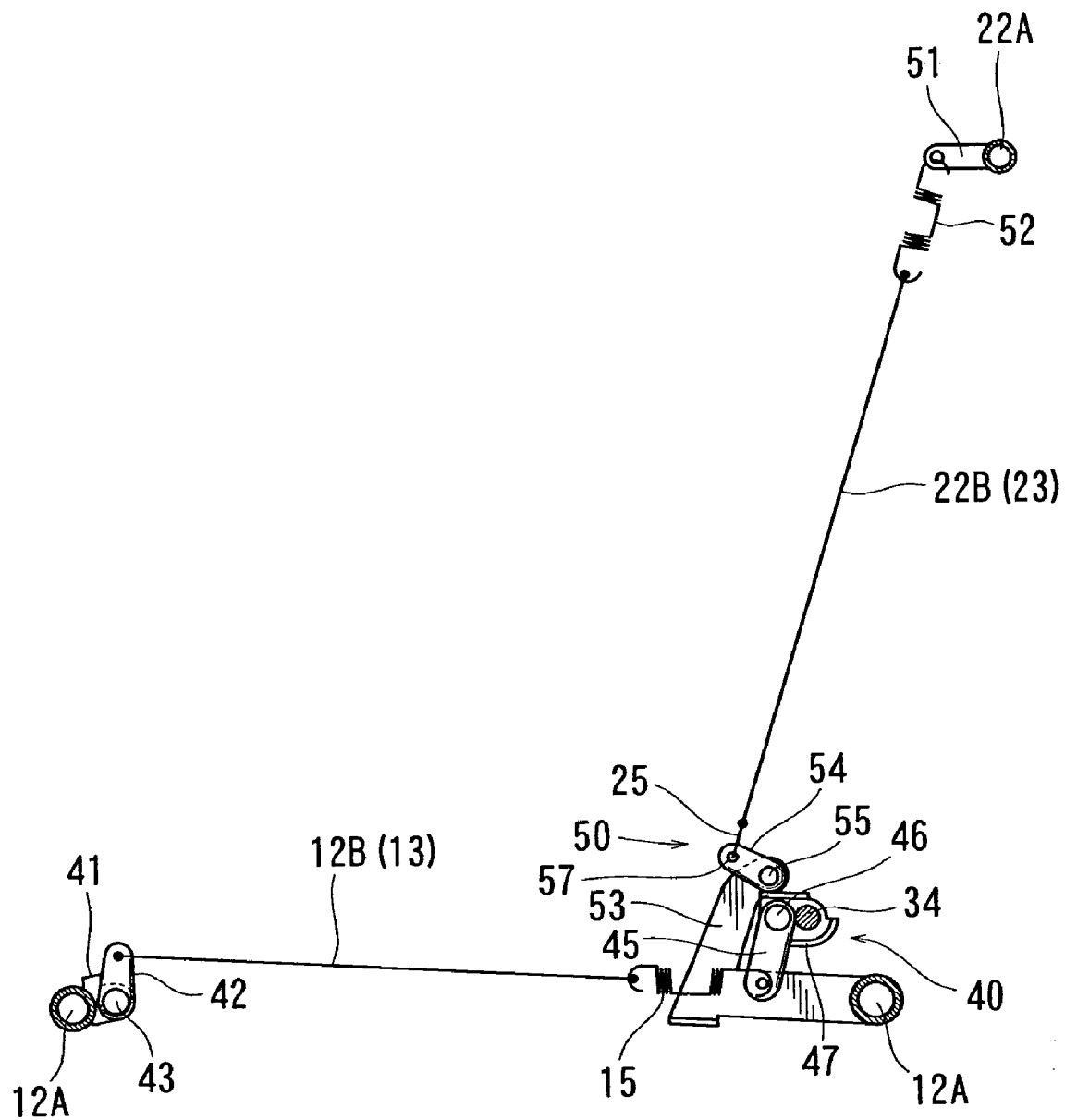
FIG. 7 is a side view of support members and a link mechanism used in the retractable seat, illustrating a condition which corresponds to the condition shown in FIG. 2.
Figure 8:
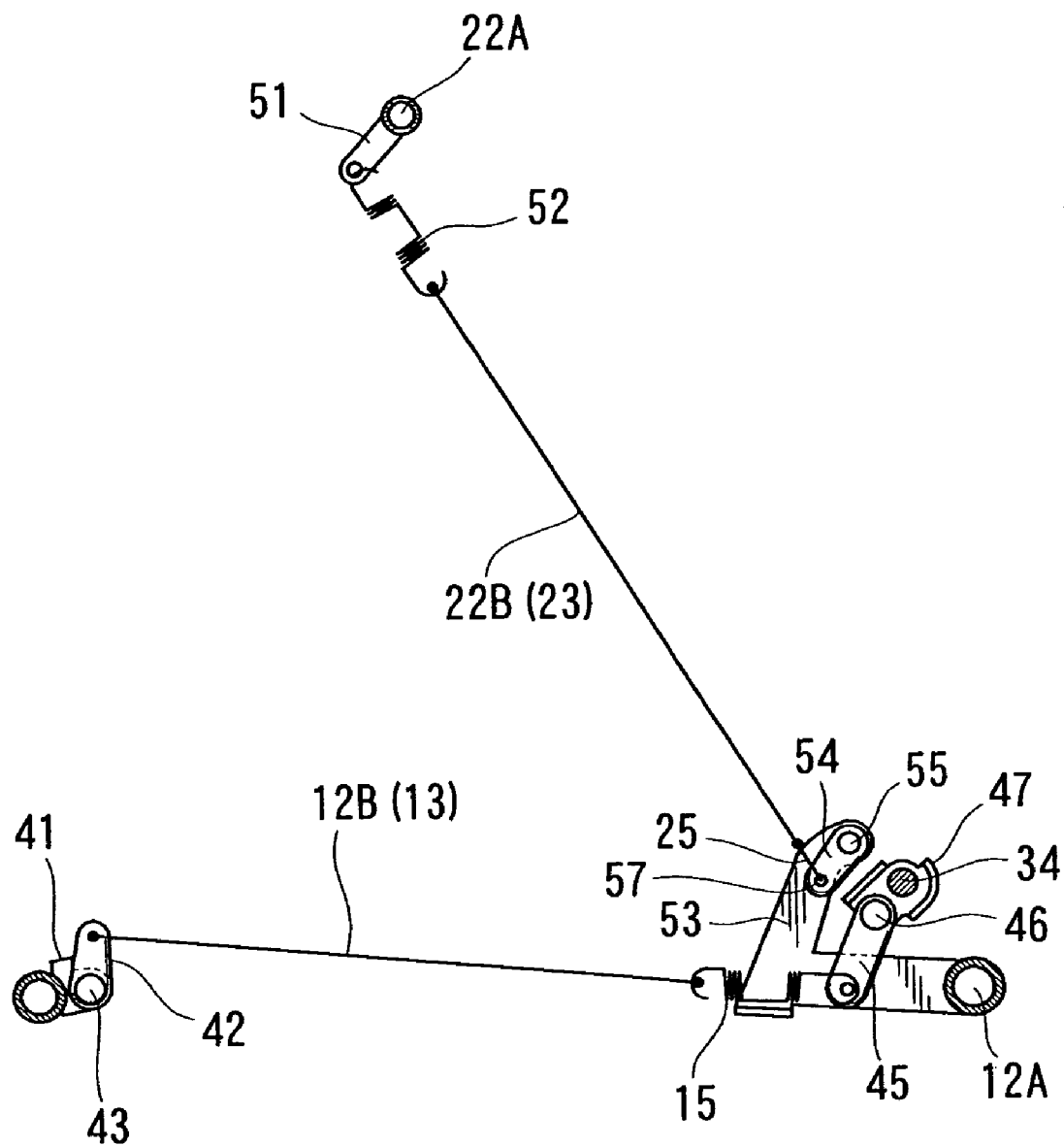
FIG. 8 is a side view of the support members and the link mechanism, illustrating a condition which corresponds to the condition shown in FIG. 3.

In the use condition of the seat 1 shown in FIGS. 2 and 7, when the seat reclining device 30 is operated or driven, the back frame 22 (the framework 22A) rotates forward (i.e., counterclockwise) around the rotational shaft 32. As a result, the back frame 22 (the seat back 20) begins to tilt forwardly toward an intermediate position shown in FIGS. 3 and 8. When the back frame 22 is tilted in this direction, the rear bracket 44 (FIG. 5) is rotated because the rear bracket 44 is fixed to the upper arm 36 of the back frame 22. Consequently, the pivot pin 46 pivots or moves counterclockwise around the rotational shaft 32 so that the rear special arm 47 rotates counterclockwise around the connecting shaft 34.

At this time, the lower link arm 54 rotates counterclockwise around the pivot pin 55. Therefore, the connecting point 57 of the lower link arm 54 and the connecting arm 25 pivots or moves counterclockwise around the pivot pin 55 so as to move toward or nearer to the rotational shaft 32 because the connecting point 57 is displaced from the pivot pin 55. Consequently, as will be apparent from comparing FIGS. 2 and 3, the pad support 22B connected to the lower link arm 54 via the connecting arm 25 moves toward a backside of the seat back 20 while moving downwardly.

Figure 9:
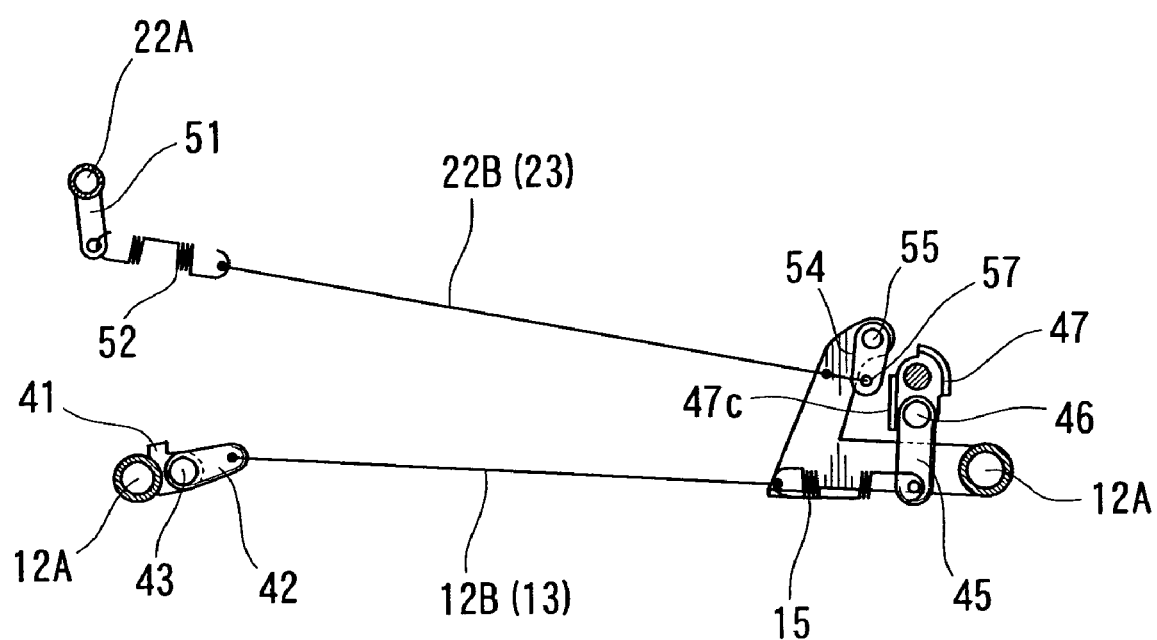
FIG. 9 is a side view of the support members and the link mechanism, illustrating a condition which corresponds to the condition shown in FIG. 4.

When the back frame 22 (the seat back 20) is further tilted forwardly toward the retracted position shown in FIGS. 4 and 9, the rear special arm 47 further rotates counterclockwise around the connecting shaft 34 so that the contact projection 47c of the rear special arm 47 contacts the rear link arm 45. Therefore, the rear link arm 45 pivots or moves counterclockwise around the rotational shaft 32 along with the pivot pin 46. Consequently, as will be apparent from comparing FIGS. 3 and 4, the pad support 12B (the support frame 13) connected to the rear link arm 45 via the coil springs 15 moves toward a backside of the seat cushion 10 while moving rearwardly. Thus, the cushion pad 18 attached to the cushion frame 12 is pulled toward the backside of the seat cushion 10. As a result, the seat cushion 10 may have a reduced thickness when the seat back 22 becomes positioned in the retracted position.

At this time, the lower link arm 54 further rotates counterclockwise around the pivot pin 55. Therefore, the connecting point 57 of the lower link arm 54 and the connecting arm 25 further pivots or moves counterclockwise around the pivot pin 55 so as to further move toward or nearer to the rotational shaft 32. Consequently, as will be apparent from comparing FIGS. 3 and 4, the pad support 22B connected to the lower link arm 54 via the connecting arm 25 further moves toward the backside of the seat back 20 while moving downwardly. Thus, the cushion pad 28 attached to the back frame 22 is pulled toward the backside of the seat back 20. As a result, the seat back 20 may have a reduced thickness when the seat back 22 becomes positioned in the retracted position.

According to the present embodiment, the thickness of the seat cushion 10 and the seat back 20 can be respectively effectively reduced when the seat back 20 is tilted from the use position to the retracted position. As a result, a total thickness of the seat cushion 10 and the seat back 20 can be effectively reduced when the seat 1 is in the retracted condition. Therefore, the seat 1 can be retracted within a reduced or limited retracting space. This may lead to minimization of the retracting space S of the seat 1. Typically, the reduction of each of thicknesses of the seat cushion 10 and the seat back 20 is approximately 10-35 mm.

Further, the first and second linking mechanisms 40 and 50 cannot be actuated when the back frame 22 rotates rearward (i.e., clockwise) from the use position around the rotational shaft 32. Therefore, the thicknesses of the seat cushion 10 and the seat back 20 cannot be respectively reduced even if the seat back 20 is tilted rearward from the use condition.

According to the present embodiment, the retractable seat 1 is designed such that the thicknesses of both of the seat cushion 10 and the seat back 20 can be reduced. However, if necessary, the seat 1 can be design changed such that a thickness of only one of the seat cushion 10 and the seat back 20 can be reduced.

Second Detailed Representative Embodiment

The second detailed representative embodiment will now described with reference to FIGS. 10 to 15.

Because the second embodiment relates to the first embodiment, only constructions and elements that are different from the first embodiment will be explained in detail. Elements that are the same in the first and second embodiments will be identified by the same reference numerals and detailed description of such elements may be omitted.

Figure 10:
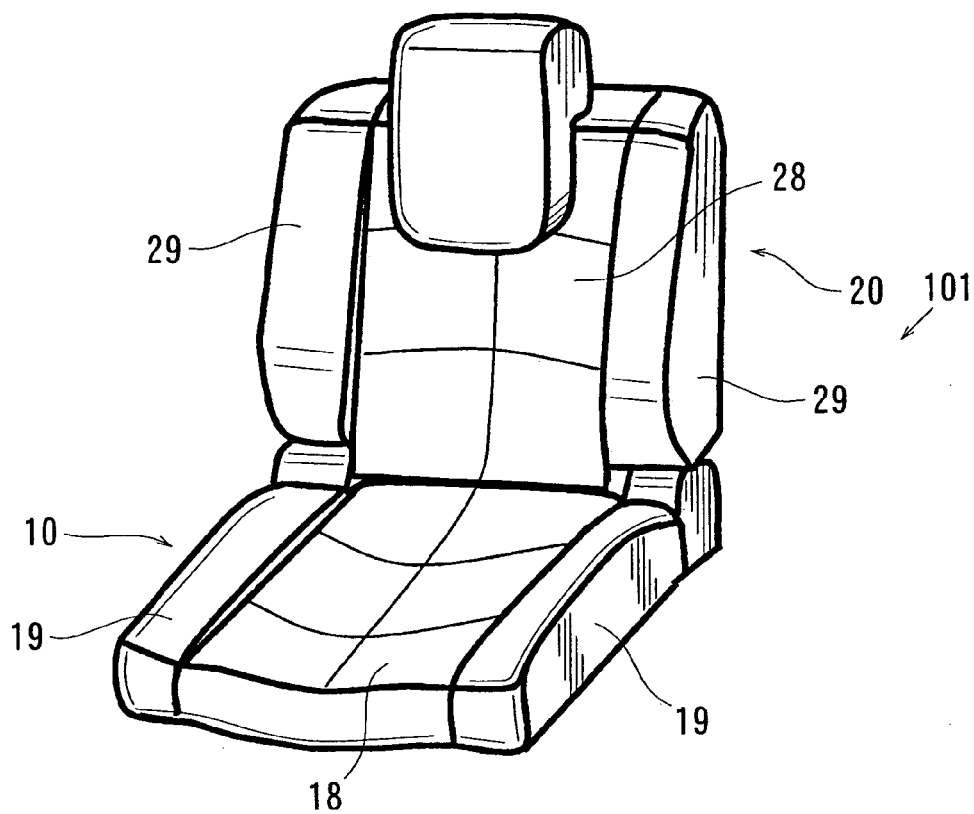
FIG. 10 is a perspective view of a retractable vehicle seat according to a second embodiment of the present invention.
Figure 11:
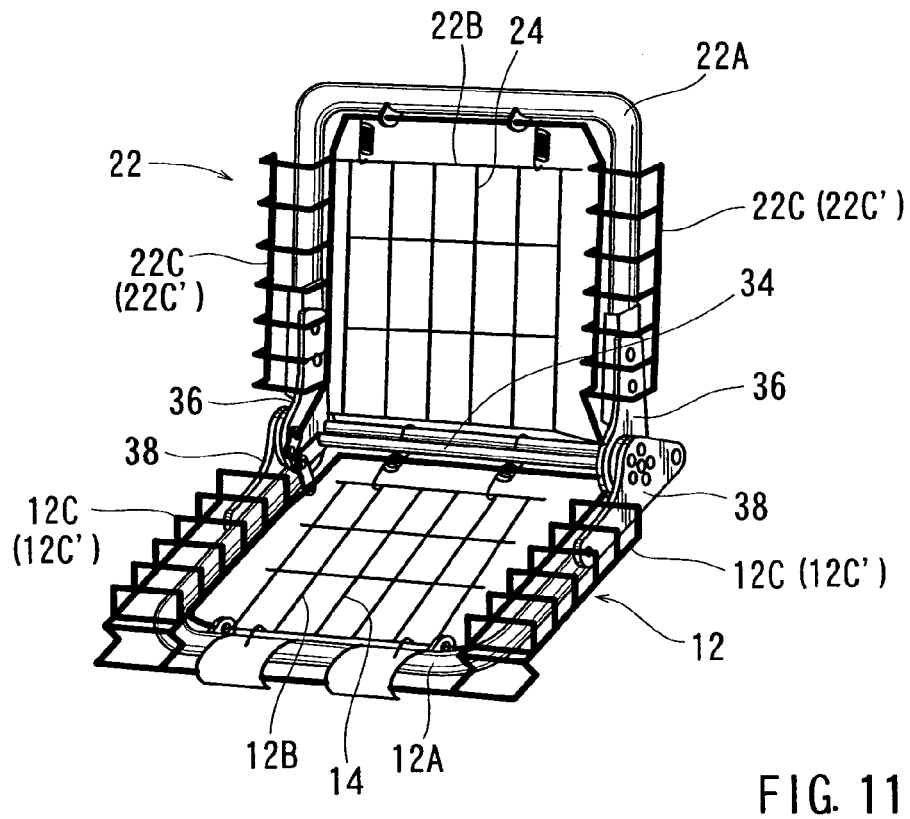
FIG. 11 is a partially omitted perspective view of the retractable vehicle seat.
Figure 12:
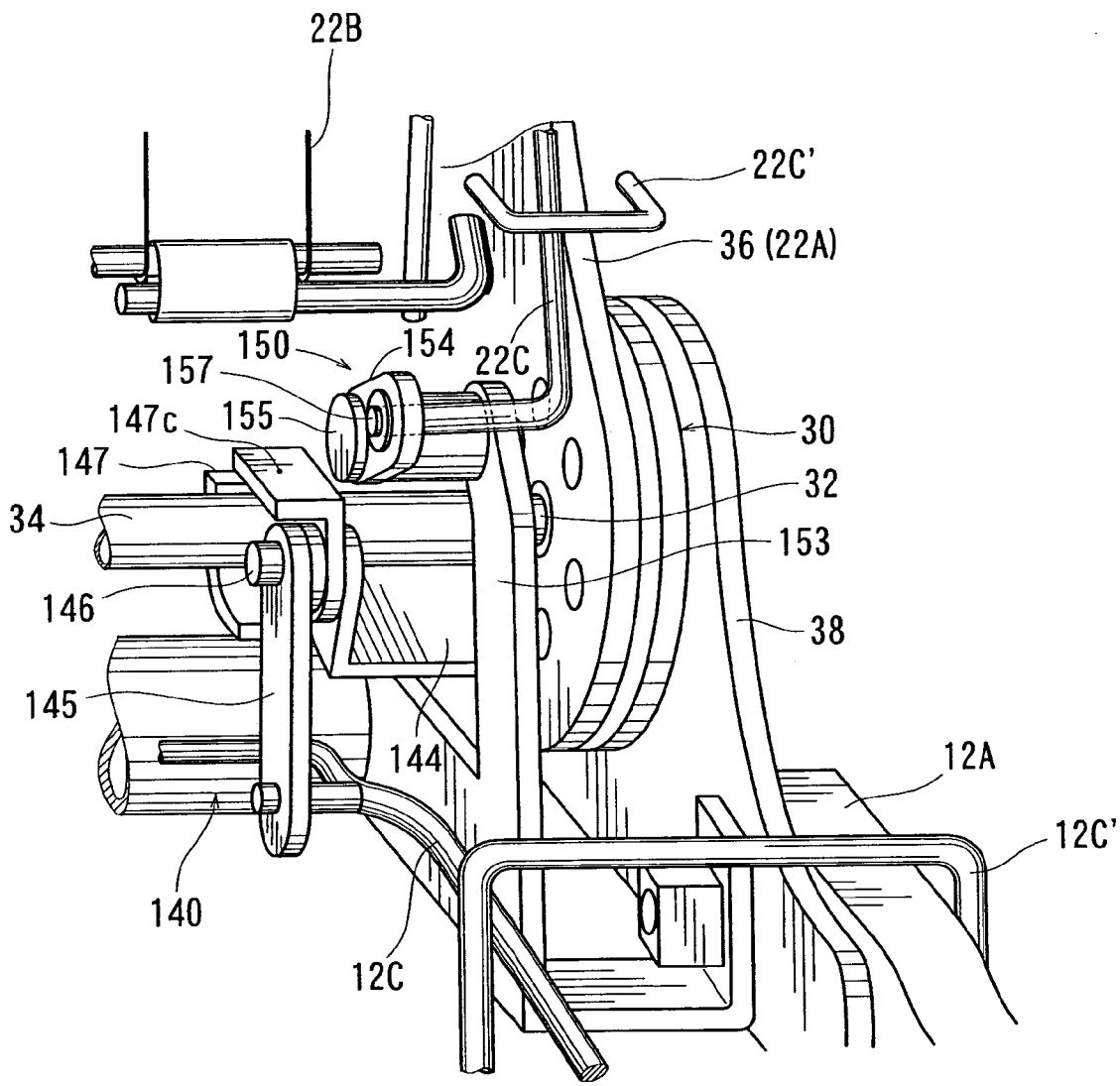
FIG. 12 is a partially enlarged perspective view of FIG. 1.

As shown in FIGS. 10 and 11, a retractable seat 101 may include the seat cushion 10 and the seat back 20. However, unlike the first embodiment, the cushion pad 18 of the seat cushion 10 includes thickened side portions 19. Also, the cushion pad 28 of the seat back 20 includes thickened side portions 29. The cushion frame 12 may preferably be constituted of the outer frame member or framework 12A and the inner support member or pad support 12B. Unlike the first embodiment, the inner pad support 12B is integrally connected to the framework 12A. The cushion frame 12 may further include a side support member or pad support 12C for supporting the thickened side portions 19 of the cushion pad 18 from a backside (under surface) thereof. The side pad support 12C may preferably be separate from the framework 12A and the inner pad support 12B. Similarly, the back frame 22 may preferably be constituted of the outer frame member or framework 22A and the inner frame member or pad support 22B. Unlike the first embodiment, the pad support 22B is integrally connected to the framework 22A. The back frame 22 may further include a side support member or pad support 22C for supporting the thickened side portions 29 of the cushion pad 28 from a backside (rear surface) thereof. The side pad support 22C may preferably be separate from the framework 22A and the inner pad support 22B.

In this embodiment, the side pad supports 12C and 22C may preferably be linked to the frameworks 12A and 22A by means of at least two first linking mechanisms (i.e., coupling means) 140 and at least two second linking mechanisms (i.e., coupling means) 150 (which will be hereinafter described).

As shown in FIG. 11, unlike the first embodiment, the inner pad support 12B of the cushion frame 12 may preferably be constituted of only the inner support net 14. Similarly, the inner pad support 22B of the back frame 22 may preferably be constituted of only the inner support net 24.

As best shown in FIG. 11, the side pad support 12C of the cushion frame 12 may preferably be formed as a combination of a plurality of spring wires. The side pad support 12C may preferably include a pair of three-dimensional side support portions 12C'. The side support portions 12C' may preferably be shaped so as to be substantially identical with the contour of the side portions 19 of the cushion pad 18. The side pad support 12C thus constructed may preferably be positioned on the framework 12A such that the side support portions 12C' correspond to the side portions of the framework 12A. Similarly, the side pad support 22C of the back frame 22 may preferably be formed as a combination of a plurality of spring wires. The side pad support 22C may preferably include a pair of three-dimensional side support portions 22C'. The side support portions 22C' may preferably be shaped so as to be substantially identical with the contour of the side portions 29 of the cushion pad 28. The side pad support 22C thus constructed may preferably be positioned on the framework 22A such that the side support portions 22C' correspond to the side portions of the framework 22A.

As shown in FIGS. 12 to 15, each of the first linking mechanisms 140 includes a front link arm 142, a front bracket 141 that is fixed to the framework 12A, a rear drive link arm 145, a rear special arm 147, and a rear bracket 144 that is fixed to the upper arm 36 of the back frame 22 (the framework 22A). The front link arm 142 may preferably be rotatably connected to a front bracket 141 via a pivot pin 143. Further, a free end of the front link arm 142 may preferably be movably connected to the side pad support 12C.

The rear link arm 145 may preferably be rotatably connected to the rear bracket 144 via a pivot pin 146 interleaving the rear special arm 147 therebetween. As will be apparent, the pivot pin 146 is not aligned with the rotational shaft 32 of the reclining device 30 (i.e., a rotational axis of the seat back 20) and is displaced forwardly therefrom. A free end of the rear link arm 145 is pivotally connected to the side pad support 12C.

Thus, the side pad support 12C of the cushion frame 12 may preferably be supported by at least four supporting points.

The rear special arm 147 substantially has the same construction as the rear special arm 47 of the first embodiment. Therefore, when the back frame 22 is forwardly rotated around the rotational shaft 32 connected to the connecting shaft 34 so that the rear bracket 144 is pivoted around the rotational shaft 32, the rear special arm 147 may also preferably rotate around the connecting shaft 34 (counterclockwise in FIGS. 13-15). As a result, the contact projections 147c of the rear special arms 147 contacts the rear link arms 145 (FIG. 9), thereby urging each rear link arm 145 such that the rear link arm 145 rotates in the corresponding direction (i.e., counterclockwise).

As shown in FIGS. 12 to 15, each of the second linking mechanisms 150 includes an upper link bracket 151 that is fixed to the framework 22A, a lower drive link arm 154, and a lower bracket 153 that is fixed to the lower arm 38 (the framework 12A of the cushion frame 12). A free end of the upper bracket 151 may preferably engage the side pad support 22C of the back frame 22.

The lower link arm 154 may preferably be rotatably connected to the lower bracket 153 via a pivot pin 155. Further, a free end of the lower link arm 154 is pivotally connected to the side pad support 22C at a connecting point 157.

Thus, the side pad support 22C of the back frame 22 may preferably be supported by at least four supporting points.

Figure 13:
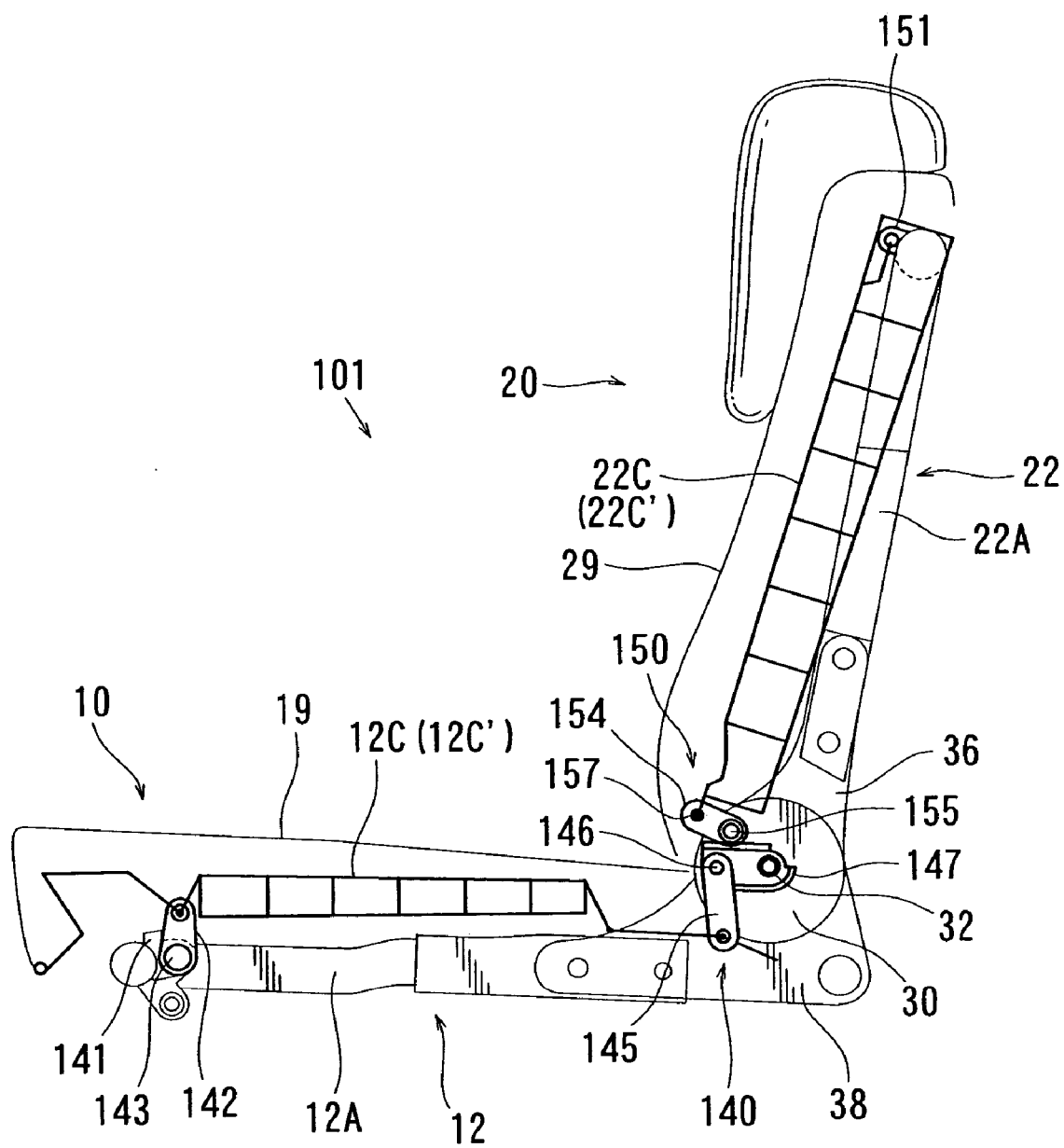
FIG. 13 is a partially omitted side view of the retractable vehicle seat, illustrating a condition in which a seat back is in a use or raised position.

Further, as shown in FIG. 13, when the seat 101 are positioned in a use condition, the side support portions 12C' of side pad support 12C is positioned in substantially an uppermost position. Also, the side support portions 22C' of side pad support 22C are positioned in substantially a forwardmost position. Thus, the seat cushion 10 and the seat back 20 may respectively have a maximum thickness.

Figure 14:
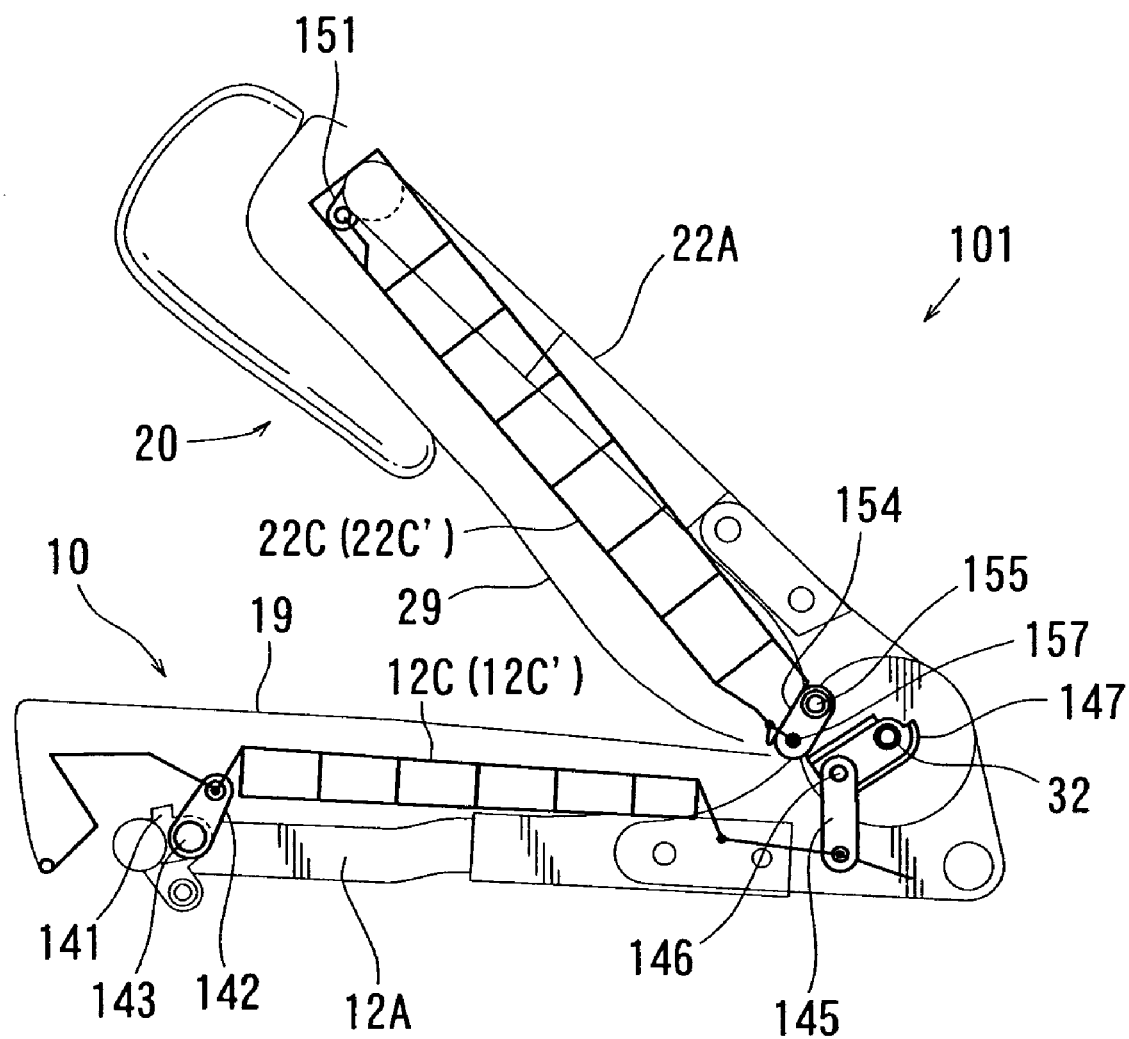
FIG. 14 is a side view of the retractable seat, illustrating a condition in which the seat back is started to be tilted forwardly (i.e., a intermediate position of the seat back)

Next, an operation for switching the seat 101 from the use condition to a retracted condition will be described with particular reference to FIGS. 13 to 15.

In the use condition of the seat 101 shown in FIG. 13, when the seat reclining device 30 is operated or driven, the back frame 22 (the framework 22A) rotates forward (i.e., counterclockwise) around the rotational shaft 32. As a result, the back frame 22 (the seat back 20) begins to tilt forwardly toward an intermediate position shown in FIG. 14. When the back frame 22 is tilted in this direction, the rear bracket 144 (FIG. 12) is rotated because the rear bracket 144 is fixed to the upper arm 36 of the back frame 22. Consequently, the pivot pin 146 pivots or moves counterclockwise around the rotational shaft 32 so that the rear special arm 147 rotates counterclockwise around the connecting shaft 34.

At this time, the lower link arm 154 rotates counterclockwise around the pivot pin 155. Therefore, the connecting point 157 of the lower link arm 154 and the side pad support 22C pivots or moves counterclockwise around the pivot pin 155 so as to move toward or nearer to the rotational shaft 32. Consequently, as will be apparent from comparing FIGS. 13 and 14, the side pad support 22C connected to the lower link arm 154 moves toward the backside of the seat back 20 while moving downwardly.

Figure 15:
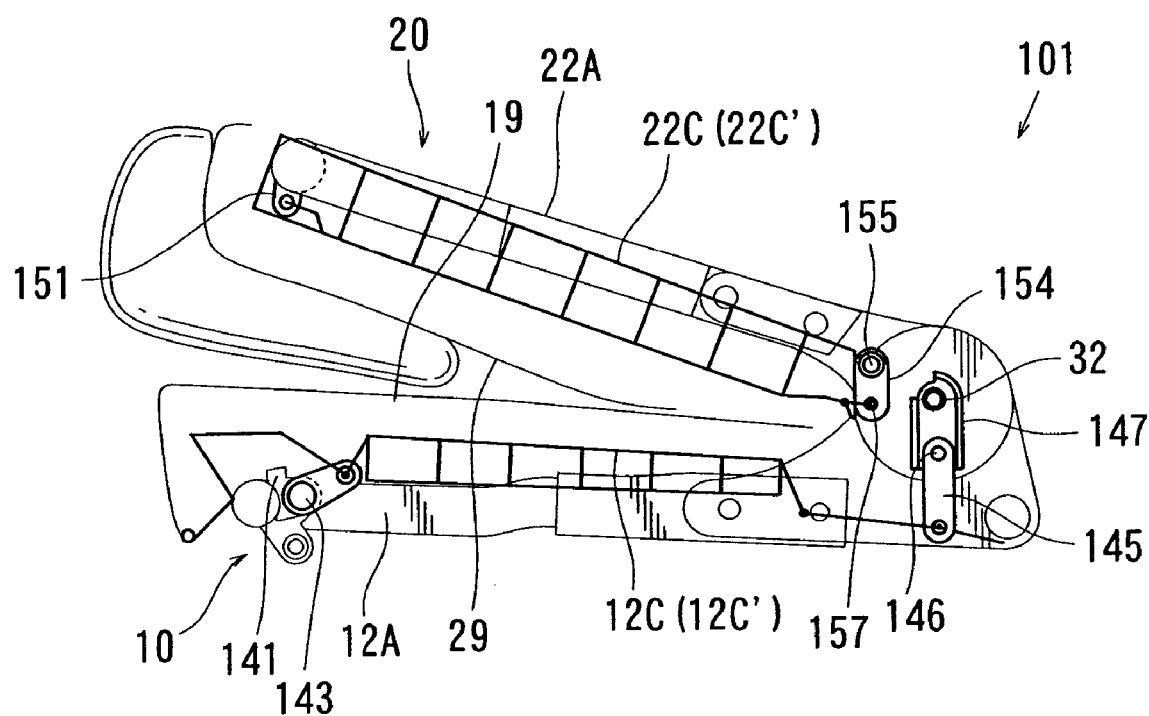
FIG. 15 is a side view of the retractable seat, illustrating a condition in which the seat back is in a retracted position.

When the back frame 22 (the seat back 20) is further tilted forwardly toward the retracted position shown in FIG. 15, the rear special arm 147 further rotates counterclockwise around the connecting shaft 34 so that the contact projection 147c (FIG. 12) of the rear special arm 147 contacts the rear link arm 145. Therefore, the rear link arm 145 pivots or moves counterclockwise around the rotational shaft 32 along with the pivot pin 146. Consequently, as will be apparent from comparing FIGS. 14 and 15, the side pad support 12C connected to the rear link arm 145 moves toward the backside of the seat cushion 10 while moving rearwardly. Thus, the side portions 19 of the cushion pad 18 attached to the cushion frame 12 are pulled toward the backside of the seat cushion 10 so that the cushion pad 18 can be effectively flattened. As a result, the seat cushion 10 may have a reduced thickness when the seat back 22 becomes positioned in the retracted position.

At this time, the lower link arm 154 further rotates counterclockwise around the pivot pin 155. Therefore, the connecting point 157 of the lower link arm 154 further pivots or moves counterclockwise around the pivot pin 155 so as to further move toward or nearer to the rotational shaft 32. Consequently, as will be apparent from comparing FIGS. 14 and 15, the side pad support 22C connected to the lower link arm 154 further moves toward the backside of the seat back 20 while moving downwardly. Thus, the side portions 29 of the cushion pad 28 attached to the back frame 22 are pulled toward the backside of the seat back 20 so that the cushion pad 28 can be effectively flattened. As a result, the seat back 20 may have a reduced thickness when the seat back 22 becomes positioned in the retracted position.

According to the present embodiment, similar to the first embodiment, the thickness of the seat cushion 10 and the seat back 20 can be respectively effectively reduced when the seat back 20 is tilted from the use position to the retracted position. As a result, a total thickness of the seat cushion 10 and the seat back 20 can be effectively reduced when the seat 101 is in the retracted condition. Therefore, the seat 101 can be retracted within a reduced or limited retracting space. This may lead to the minimization of a retracting space (not shown) of the seat 101.

Further, the retractable seat 101 in this embodiment is not designed such that the side portions 19 and 29 of the cushion pad 18 and 28 are laterally or transversely moved when the seat back 20 is tilted. Therefore, the side portions 19 and 29 may have a sufficient side support function.

According to the present embodiment, the retractable seat 101 is designed such that the thicknesses of both of the seat cushion 10 and the seat back 20 can be reduced. However, similar to the first embodiment, if necessary, the seat 101 can be design changed such that a thickness of only one of the seat cushion 10 and the seat back 20 can be reduced.

Third Detailed Representative Embodiment

The third detailed representative embodiment will now described with reference to FIGS. 16 to 24.

Because the third embodiment relates to the second embodiment, only constructions and elements that are different from the second embodiment will be explained in detail. Elements that are the same in the second and third embodiments will be identified by the same reference numerals and detailed description of such elements may be omitted.

Figure 16:
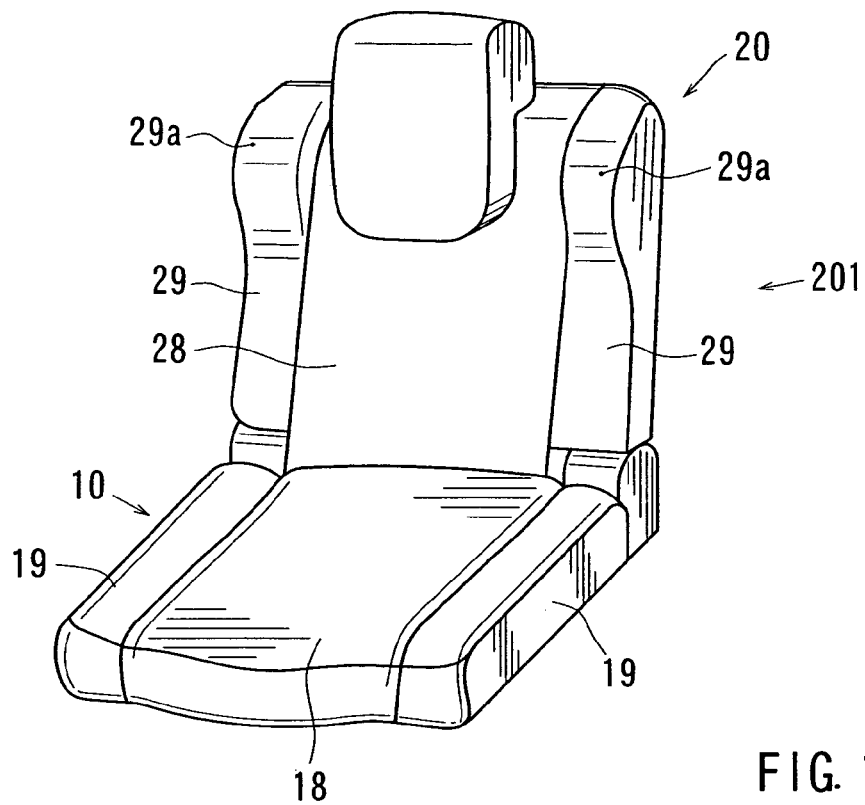
FIG. 16 is a perspective view of a retractable vehicle seat according to a third embodiment of the present invention.
Figure 17:
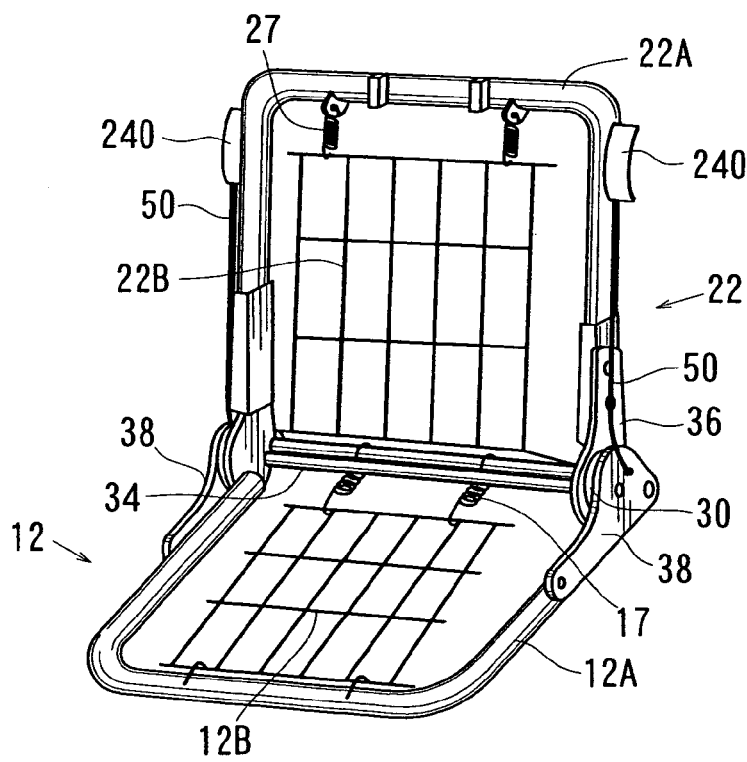
FIG. 17 is a partially omitted perspective view of the retractable vehicle seat.

As shown in FIGS. 16 and 17, a retractable seat 201 may include the seat cushion 10 and the seat back 20. Similar to the second embodiment, the cushion pad 18 of the seat cushion 10 includes the thickened side portions 19. Also, the cushion pad 28 of the seat back 20 includes the thickened side portions 29. Further, unlike the second embodiment, each of the thickened side portions 29 includes an upper projected portion (i.e., an upper side portion) 29a. As will be appreciated, each of the upper projected portions 29a may preferably be positioned so as to correspond to a shoulder of an occupant (not shown).

The cushion frame 12 may preferably be constituted of the outer frame member or framework 12A and the inner support member or pad support 12B. The inner pad support 12B is connected to the framework 12A via springs 17. Similarly, the back frame 22 may preferably be constituted of the outer frame member or framework 22A and the inner frame member or pad support 22B. The pad support 22B is connected to the framework 22A via springs 27.

Figure 18:
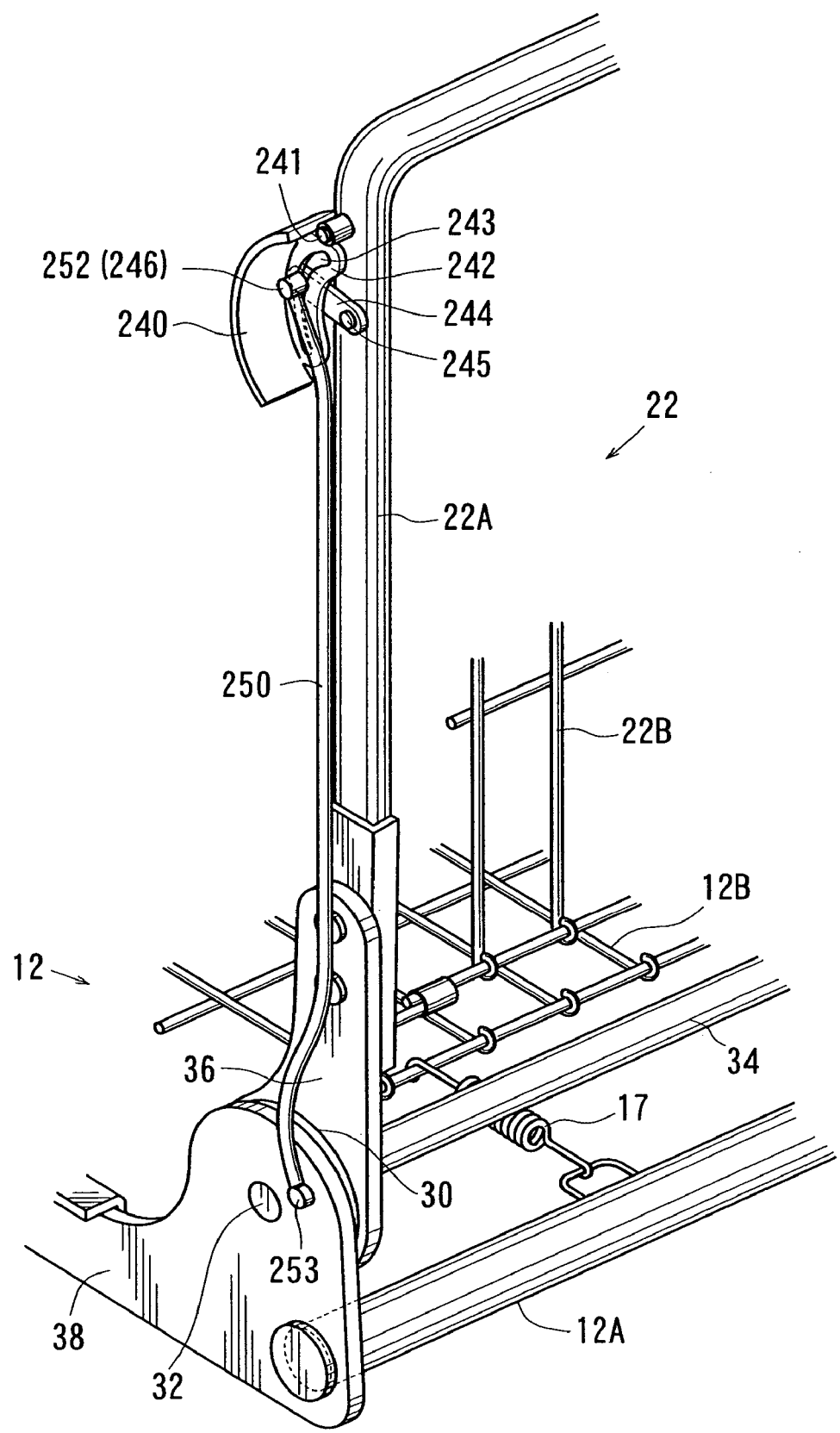
FIG. 18 is a partially enlarged perspective view of FIG. 17.

As best shown in FIGS. 17 and 18, the framework 22A of the back frame 22 is provided with a pair of curved upper support members or pad supports 240 attached thereto. As will be apparent, the upper pad supports 240 may preferably be positioned on both sides of the framework 22A so as to correspond to the upper projected portions 29a of the cushion pads 28. Also, each of the upper pad supports 240 may preferably be shaped so as to be substantially identical with the contour of the upper projected portion 29a. An upper end of the upper pad support 240 may preferably be rotatably connected to the framework 22A via a hinge pin 241 so that the upper pad support 240 can pivot or rotate forward and rearward therearound. As best shown in FIG. 18, the upper pad support 240 is integrally provided with a curved side wall 242 that is positioned adjacent to the framework 22A. The side wall 242 is formed with an arcuate guide slot (i.e., a guide mechanism) 243 extending therealong.

As shown in FIG. 18, the framework 22A of the back frame 22 is also provided with a pair of upper movable members or link arms (i.e., linking mechanisms) 244 associated with the upper pad supports 240. One end of each upper link arm 244 may preferably be rotatably connected to the framework 22A via a hinge pin 245 that is positioned at a lower side of the hinge pin 241. The other end of each upper link arm 244 is provided with a guide pin (i.e., the guide mechanism) 246 which slidably engages the guide slot 243.

As shown in FIG. 18, the framework 22A of the back frame 22 is further provided with a pair of elongated vertical connecting members or connecting rods (i.e., the linking mechanisms) 250 (one of which is shown). Each of the connecting rods 250 may preferably have an upper connecting end 252 and a lower connecting end (i.e. connecting point) 253. The upper connecting end 252 may preferably be connected to the guide pin 246 of the upper link arm 244. The lower connecting end 253 may preferably be rotatably connected to the lower arm 38 of the cushion frame 12. As will be apparent, the lower connecting end 253 may preferably be displaced upwardly and rearwardly from the rotational shaft 32.

Figure 19:
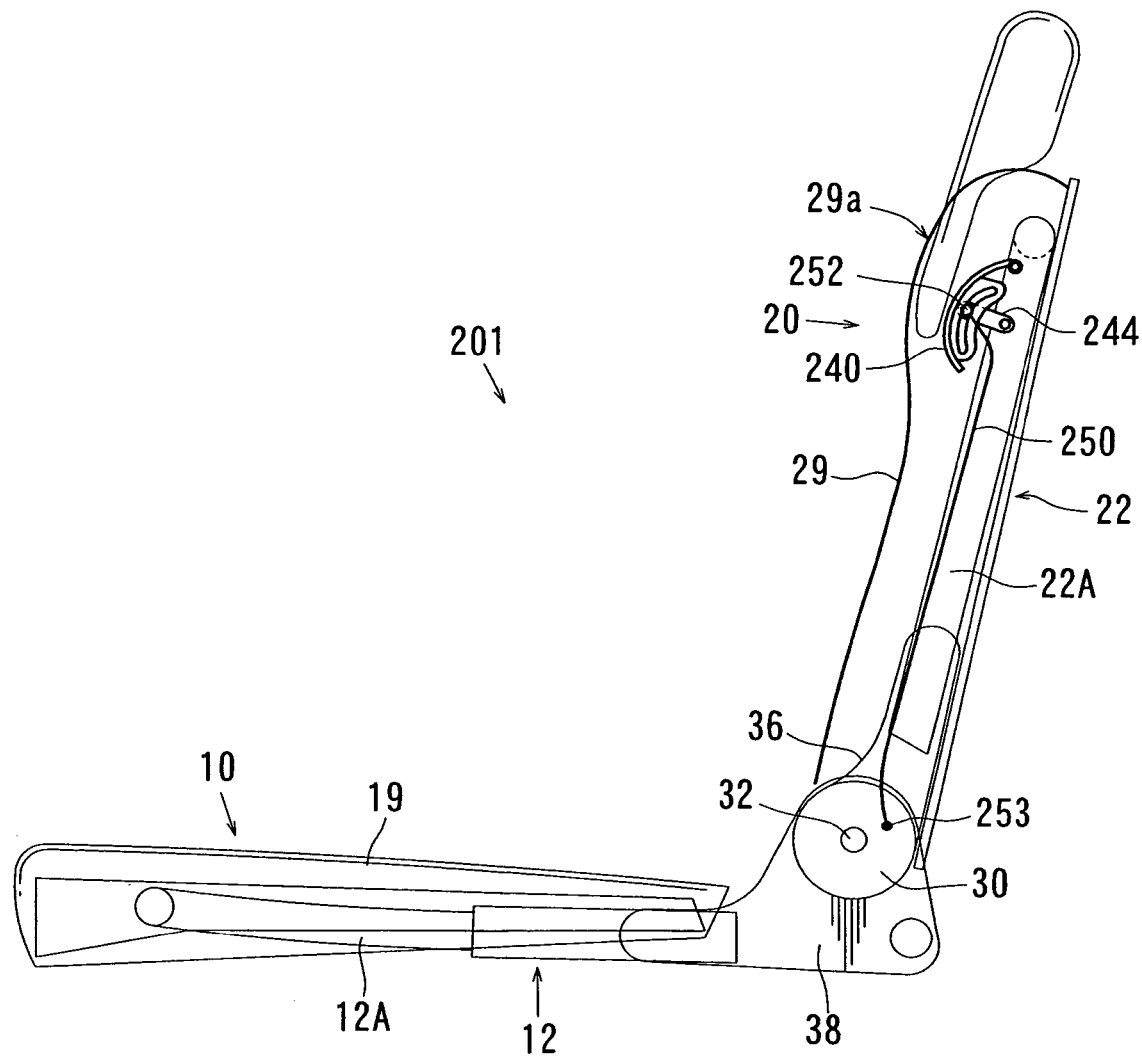
FIG. 19 is a partially omitted side view of the retractable vehicle seat, illustrating a condition in which a seat back is in a use or raised position.
Figure 20:
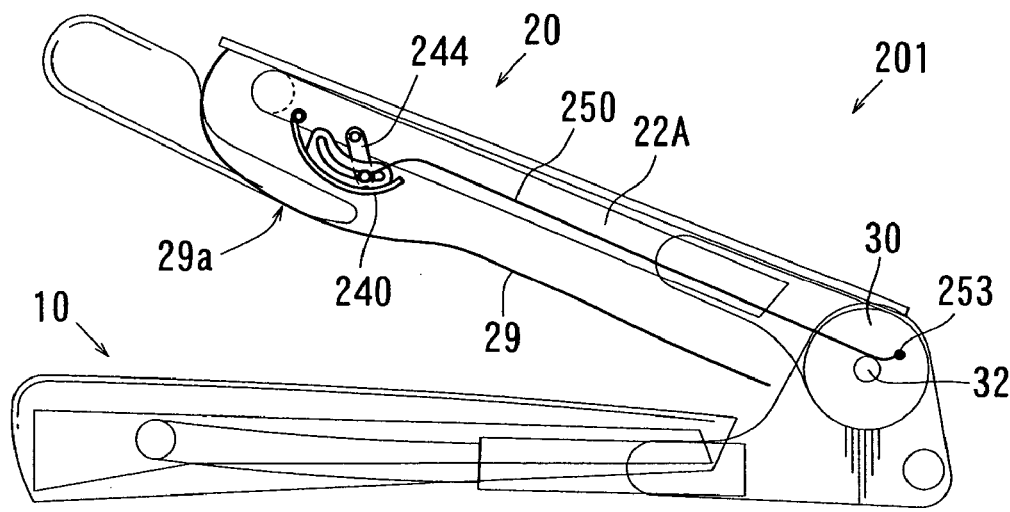
FIG. 20 is a side view of the retractable seat, illustrating a condition in which the seat back is started to be tilted forwardly (i.e., a intermediate position of the seat back)
Figure 22:
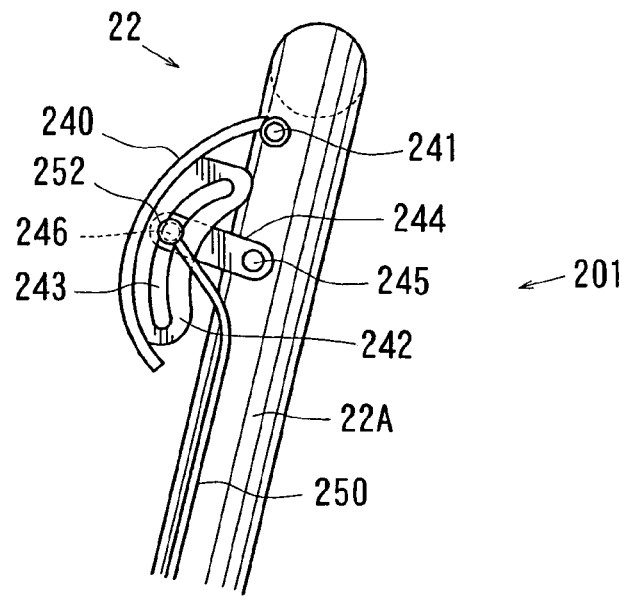
FIG. 22 is a partially enlarged view of FIG. 19.
Figure 23:
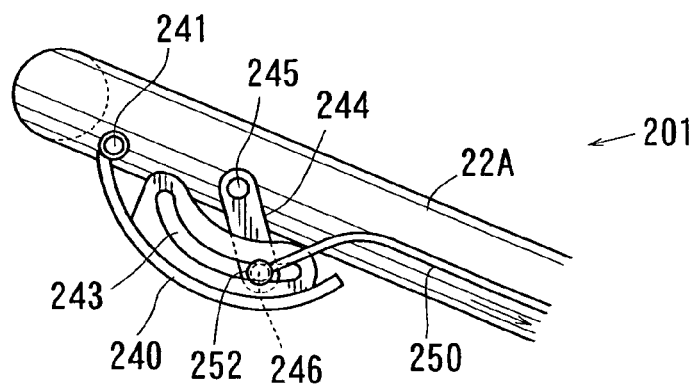
FIG. 23 is a partially enlarged view of FIG. 20.
Figure 24:
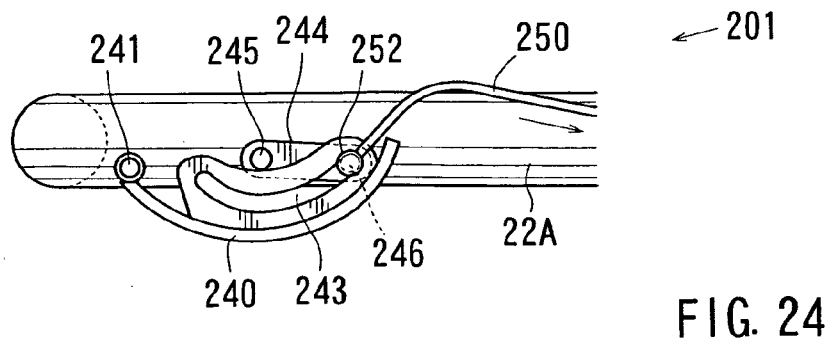
FIG. 24 is a partially enlarged view of FIG. 21.

As shown in FIGS. 19 and 22, when the seat 201 is positioned in a use condition, the guide pin 246 is located in a mid position within the guide slot 243. At this time, the pad support 240 fully or maximally projects forwardly. That is, the pad support 240 projects forwardly beyond the pad support 22B. Thus, the upper projected portion 29a may preferably be produced in the thickened side portion 29.

Next, an operation for switching the seat 201 from the use condition to a retracted condition will be described in particular with reference to FIGS. 19 to 24.

In the use condition of the seat 201 shown in FIG. 19, when the seat reclining device 30 is operated or driven, the back frame 22 (the framework 22A) rotates forward (i.e., counterclockwise) around the rotational shaft 32. As a result, the back frame 22 (the seat back 20) begins to tilt forwardly toward an intermediate position shown in FIG. 20. When the back frame 22 is tilted in this direction, the hinge pin 241 of the upper pad support 240 and the hinge pin 245 of the upper link arm 244 are pivoted or moved around the rotational shaft 32. Also, the upper connecting end 252 of the connecting rod 250 (i.e., the guide pin 246 of the upper link arm 244) is pivoted or moved around the lower connecting end 253 of the connecting rod 250. At this time, the upper connecting end 252 of the connecting rod 250 may preferably be pulled downwardly (i.e., in the direction shown by arrow in FIG. 23) because the lower connecting end 253 is displaced rearwardly from the rotational shaft 32. Consequently, as will be apparent from comparing FIGS. 22 and 23, the upper link arm 244 rotates counterclockwise around the hinge pin 245.

Upon rotation of the upper link arm 244, the guide pin 246 of the upper link arm 244 slides downward along the guide slot 243 of the upper pad support 240 so that the upper pad support 240 rotates counterclockwise around the hinge pin 241. As a result, the upper pad support 240 substantially moves toward the backside of the seat back 20.

Figure 21:
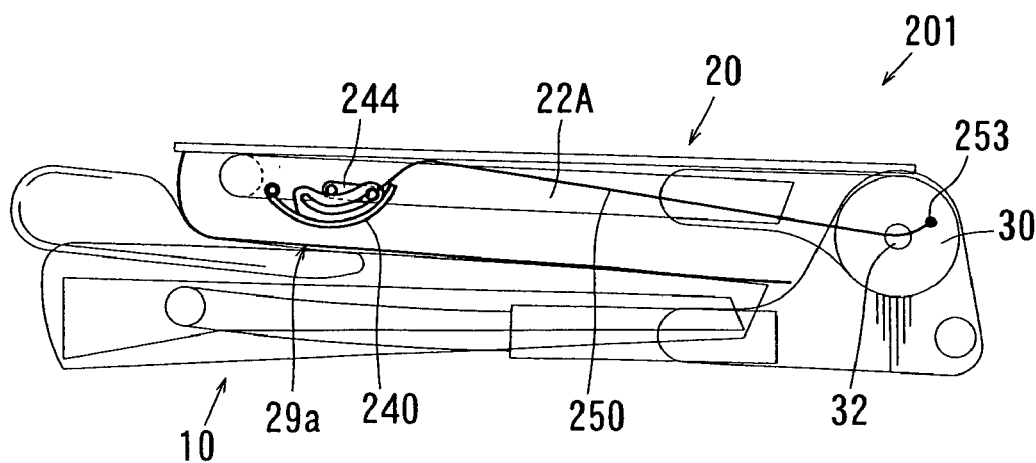
FIG. 21 is a side view of the retractable seat, illustrating a condition in which the seat back is in a retracted position.

When the back frame 22 (the seat back 20) is further tilted forwardly toward the retracted position shown in FIG. 21, the upper connecting end 252 of the connecting rod 250 is further pulled downwardly so that the upper link arm 244 further rotates counterclockwise around the hinge pin 245. Upon further rotation of the upper link arm 244, the guide pin 246 of the upper link arm 244 further slides downward along the guide slot 243 of the upper pad support 240 so that the upper pad support 240 further rotates counterclockwise around the hinge pin 241. As a result, the upper pad support 240 substantially moves further toward the backside of the seat back 20.

Thus, when the back frame 22 is tilted in the retracted position, the upper projected portion 29a of the cushion pad 28 is fully pulled toward the backside of the seat back 20 because the upper pad support 240 corresponds to the upper projected portion 29a. As a result, the upper projected portion 29a may preferably be eliminated so that the side portion 29 of the cushion pad 28 can be effectively flattened. As a result, the seat back 20 may have a reduced thickness when the seat back 22 becomes oriented in the retracted position.

According to the present embodiment, the thickness of the seat back 20 can be respectively effectively reduced when the seat back 20 is tilted from the use position to the retracted position. As a result, a total thickness of the seat cushion 10 and the seat back 20 can be effectively reduced when the seat 201 is in the retracted condition. Therefore, the seat 201 can be retracted within a reduced or limited retracting space. This may lead to the minimization of a retracting space (not shown) of the seat 201.

Fourth Detailed Representative Embodiment

The fourth detailed representative embodiment will now described with reference to FIGS. 25 to 27.

Because the fourth embodiment relates to the third embodiment, only constructions and elements that are different from the third embodiment will be explained in detail. Elements that are the same in the third and fourth embodiments will be identified by the same reference numerals and detailed description of such elements may be omitted.

Figure 25:
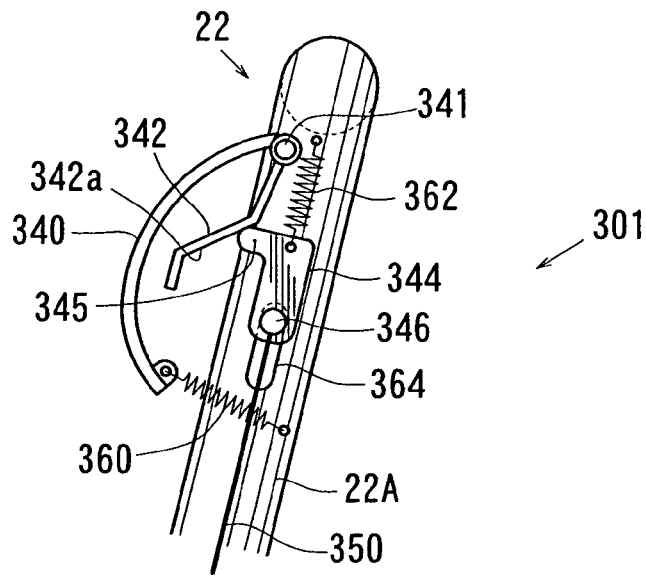
FIG. 25 is a view similar to FIG. 22, illustrating a retractable vehicle seat according to a fourth embodiment of the present invention.
Figure 26:
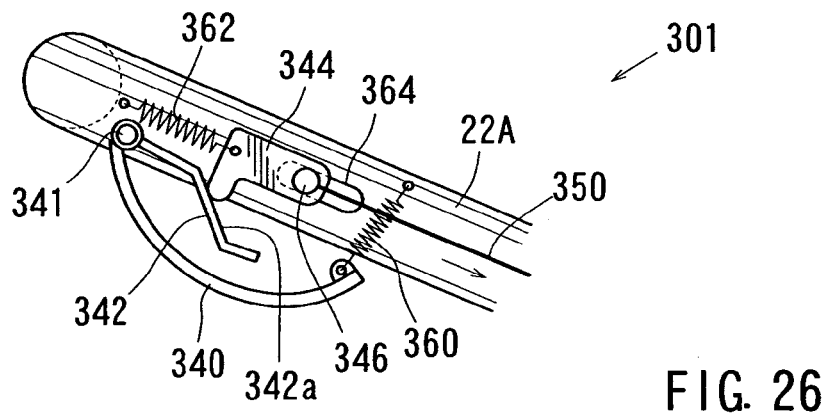
FIG. 26 is a view similar to FIG. 23.
Figure 27:
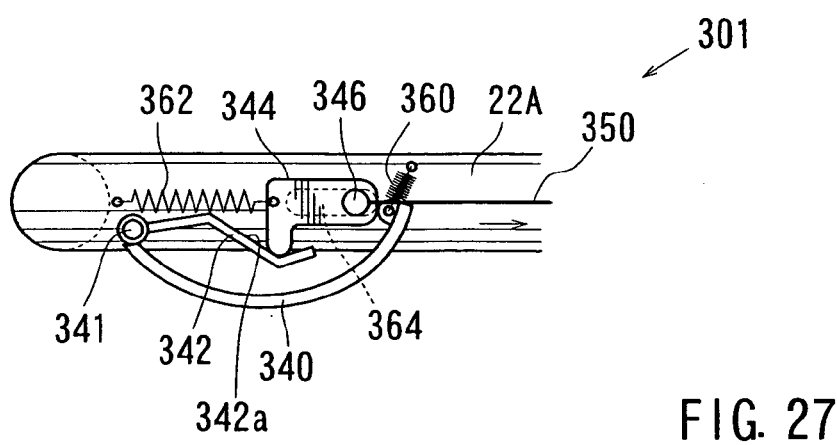
FIG. 27 is a view similar to FIG. 24.

As shown in FIGS. 25 to 27, a retractable seat 301 may include the seat cushion 10 and the seat back 20. Similar to the third embodiment, the framework 22A of the back frame 22 is provided with a pair of curved upper pad supports 340 attached thereto (one of which is shown). The upper pad supports 340 may preferably be positioned on both sides of the framework 22A so as to correspond to the upper projected portions 29a of the cushion pads 28. Also, each of the upper pad supports 340 may preferably be shaped so as to be substantially identical with the contour of the upper projected portion 29a. An upper end of the upper pad support 340 may preferably be rotatably connected to the framework 22A via a hinge pin 341 so that the upper pad support 340 can be rotated forward and rearward therearound. The upper pad support 340 is integrally provided with a cam member (i.e., a guide mechanism) 342 that extends downwardly along the rear side of the upper pad support 340. A lower end of the upper pad support 340 may preferably be connected to the framework 22A via a spring 360 so that the upper pad support 340 (the cam member 342) can be normally forced counterclockwise around the hinge pin 341.

The framework 22A of the back frame 22 is also provided with a pair of upper movable members or slide members (i.e., linking mechanisms) 344 (one of which is shown) associated with the cam members 342. Each of the slide members 344 includes an upper projected portion (i.e., the guide mechanism) 345 and a lower guide pin 346. The projected portion 345 is arranged and constructed to engage a cam surface 342a of the cam member 342. Also, the guide pin 346 slidably engages a guide slot 364 that is vertically or longitudinally formed in the framework 22A. Further, an upper end of the slide member 344 may preferably be connected to the framework 22A via a return spring 362. The return spring 362 is arranged and constructed to upwardly force the slide member 344. As will be easily understood, the return spring 362 may preferably have a spring force greater than the spring 360 of the upper pad support 340.

The framework 22A of the back frame 22 is further provided with a pair of elongated vertical connecting members or connecting cables (i.e., the linking mechanisms) 350 (one of which is shown). An upper end of each connecting cable 350 may preferably be connected to a lower end of the slide member 344. Although not shown in FIGS. 25 to 27, similar to the third embodiment, a lower end of each connecting cable 350 may preferably be rotatably connected to the lower arm 38 of the cushion frame 12.

As shown in FIG. 25, when the seat 301 is positioned in a use condition, the slide member 344 is retained in an uppermost position by means of the return spring 362. At this time, the projected portion 345 of the slide member 344 may preferably contact an uppermost point of the cam surface 342a of the cam member 342 so that the pad support 340 is fully projected forwardly. Thus, the upper projected portion 29a may preferably be produced in the thickened side portion 29.

Next, an operation for switching the seat 301 from the use condition to a retracted condition will be described with reference to FIGS. 25 to 27.

In the use condition of the seat 301 shown in FIG. 25, when the seat reclining device 30 is operated or driven, the back frame 22 (the framework 22A) rotates forward (i.e., counterclockwise) around the rotational shaft 32. As a result, the back frame 22 (the seat back 20) begins to tilt forwardly toward an intermediate position shown in FIG. 26. When the back frame 22 is tilted in this direction, the guide pin 346 of the slide member 344 is pulled downwardly via the connecting cable 350 so as to slide downwardly within the guide slot 364. As a result, the slide member 344 slides downwardly against the spring force of the return spring 362. Therefore, the projected portion 345 of the slide member 344 may preferably slide downwardly along the cam surface 342a of the cam member 342. Consequently, the pad support 340 rotates counterclockwise around the hinge pin 341 so as to substantially move toward the backside of the seat back 20 because the upper pad support 340 may preferably be forced toward the framework 22A via the spring 360.

When the back frame 22 (the seat back 20) is further tilted forwardly toward the retracted position shown in FIG. 27, the guide pin 346 of the slide member 344 is further pulled downwardly via the connecting cable 350 so that the slide member 344 further slides downwardly against the spring force of the return spring 362. Therefore, the projected portion 345 of the slide member 344 further slides downwardly along the cam surface 342a of the cam member 342 so that the pad support 340 further rotates counterclockwise around the hinge pin 341. As a result, the pad support 340 substantially moves further toward the backside of the seat back 20.

Thus, when the back frame 22 is tilted to the retracted position, the upper projected portion 29a of the cushion pad 28 is fully pulled toward the backside of the seat back 20 because the upper pad support 340 corresponds to the upper projected portion 29a. As a result, the upper projected portion 29a may preferably be eliminated so that the side portion 29 of the cushion pad 28 can be effectively flattened. As a result, the seat back 20 may have a reduced thickness when the seat back 22 becomes positioned in the retracted position.

In the third and fourth embodiments, the pad supports 240 and 340 are respectively designed so as to rotate around the hinge pins 241 and 341. However, the pad supports 240 and 340 can be respectively designed so as to linearly slide toward the backside of the seat back 20.

Further, in the first to fourth embodiments, although a retractable seat in which the seat back is tilted or folded is exemplified, the present invention can be applied to a seat in which the seat cushion is tilted or raised.

Representative examples of the present invention have been described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present teachings.

The invention claimed is:

1. A retractable seat comprising a seat cushion and a seat back rotatably supported on the seat cushion in which one of the seat cushion and the seat back is arranged and constructed to be folded onto the other of the seat cushion and the seat back, at least one of the seat cushion and the seat back comprising:
   a frame,
   a cushion pad, and
   a linking mechanism,
   wherein the frame comprises a framework and a support member that supports the cushion pad from a backside of the cushion pad, and
   wherein the linking mechanism movably interconnects the framework and the support member and is arranged and constructed to connect the support member of one of the seat cushion and the seat back to the framework of the other of the seat cushion and the seat back at a connecting point that is displaced from a rotational axis of the framework of the seat cushion or the seat back, and wherein the linking mechanism is arranged and constructed such that when the seat cushion or the seat back is tilted toward a retracted position, the connecting point moves nearer to the rotational axis, thereby moving the support member relative to the framework along a thickness direction of the seat cushion or the seat back.

2. A retractable seat as defined in claim 1, wherein the linking mechanism comprises a link arm that is positioned in the connecting point of the support member and the framework, and wherein the link arm is rotatably connected to the support member and the framework.

3. A retractable seat as defined in claim 1, wherein the linking mechanism comprises a connecting arm that is arranged and constructed to rotate when the seat cushion or the seat back is tilted, and wherein the connecting arm is connected to the support member of the seat cushion or the seat back.

4. A retractable seat as defined in claim 3, wherein the linking mechanism comprises a link bracket that is positioned in a side opposite to the rotational axis of the framework of the seat cushion or the seat back and is rotatably connected to the framework, wherein the link bracket has a free end that is connected to the support member, and wherein the connecting arm is arranged and constructed to pull the support member of the seat cushion or the seat back toward the rotational axis of the framework of the seat cushion or the seat back when the seat cushion or the seat back is tilted toward the retracted position.

5. A retractable seat as defined in claim 1 wherein the support member comprises a central support member that is separated from the framework, and wherein the central support member is arranged and constructed to support a substantial portion of the cushion pad.

6. A retractable seat as defined in claim 1 wherein the support member comprises a side support member that is separated from the framework, and wherein the side support member is arranged and constructed to support a side portion of the cushion pad.

7. A retractable seat as defined in claim 1 wherein the seat comprises a rear seat.

8. A retractable seat as defined in claim 1 wherein the seat is arranged and constructed to be retracted in a retracting space formed in a vehicle floor.

9. A retractable seat comprising a seat cushion and a seat back rotatably supported on the seat cushion in which one of the seat cushion and the seat back is arranged and constructed to be folded onto the other of the seat cushion and the seat back, at least one of the seat cushion and the seat back comprising:
   a frame
   a cushion pad, and
   a linking mechanism,
   wherein the frame comprises a framework and a support member that supports the cushion pad from a backside of the cushion pad, and
   wherein the linking mechanism movably interconnects the framework and the support member and is arranged and constructed to connect the support member of one of the seat cushion and the seat back to the framework of the other of the seat cushion and the seat back at a connecting point that is displaced from a rotational axis of the framework of the seat cushion or the seat back, and wherein the linking mechanism is arranged and constructed such that when the seat cushion or the seat back is tilted toward the retracted position, the connecting point moves nearer to the rotational axis, thereby moving the support member relative to the framework along a longitudinal direction of the seat cushion or the seat back.

10. A retractable seat as defined in claim 9, wherein the linking mechanism comprises a link arm that is positioned in the connecting point of the support member and the framework, and wherein the link arm is rotatably connected to the support member and the framework.

* * * * *